US012762856B2

(12) United States Patent
Herzberg et al.

(10) Patent No.: US 12,762,856 B2
(45) **Date of Patent: *Oct. 13, 2026**

(54) AUGMENTED, VIRTUAL AND MIXED-REALITY CONTENT SELECTION AND DISPLAY FOR FLYERS

(71) Applicant: Techinvest Company Limited, Nassau (BS)

(72) Inventors: Stefan W. Herzberg, Nassau (BS); Megan Herzberg, Nassau (BS)

(73) Assignee: Techinvest Company Limited, Nassau (BS)

( * ) Notice: Subject to any disclaimer, the term of this patent is extended or adjusted under 35 U.S.C. 154(b) by 579 days.

This patent is subject to a terminal disclaimer.

(21) Appl. No.: 17/689,911

(22) Filed: Mar. 8, 2022

(65) Prior Publication Data

US 2022/0189161 A1 Jun. 16, 2022

Related U.S. Application Data

(63) Continuation-in-part of application No. 17/641,300, filed on Mar. 8, 2022, now Pat. No. 11,961,294, and a continuation-in-part of application No. 17/228,821, filed on Apr. 13, 2021, now Pat. No. 11,580,733, and a continuation-in-part of application No. 17/228,814, filed as application No. PCT/IB2020/058386 on Sep. 9, 2020, now Pat. No. 11,574,472, said application No. 17/228,821 is a continuation of application No. 16/895,637, filed on Jun. 8, 2020, now Pat. No. 10,997,419, said application No. PCT/IB2020/058386 is a continuation-in-part of application No. 16/893,236, filed on Jun. 4, 2020, now Pat. No. 10,997,418, said application No. 17/228,814 is a continuation of application No. 16/893,236, filed on Jun. 4, 2020, now Pat. No.

(Continued)

(51) Int. Cl.
*G06V 20/20* (2022.01)
*G06Q 30/0251* (2023.01)
*G06V 30/40* (2022.01)

(52) U.S. Cl.
CPC ......... *G06V 20/20* (2022.01); *G06Q 30/0251* (2013.01); *G06V 30/40* (2022.01)

(58) Field of Classification Search
CPC ..... G06Q 30/0251; G06V 20/20; G06V 30/40
USPC ........................................................ 345/633
See application file for complete search history.

(56) References Cited

U.S. PATENT DOCUMENTS 7,170,391 B2 1/2007 Lane
9,886,845 B2 2/2018 Rhoads (Continued)

FOREIGN PATENT DOCUMENTS

WO 2013138846 A1 9/2013

OTHER PUBLICATIONS

Letellier et al., "Providing Adittional Cotent to Print Media Using Augmented Reality", IEEE, 2017. (Year: 2017).*

(Continued)

*Primary Examiner* — Nicholas R Wilson
(74) *Attorney, Agent, or Firm* — Nixon & Vanderhye P.C.

(57) ABSTRACT

A flyer information system recognizes a real world object relating to a flyer based transaction and uses augmented, mixed and/or virtual reality to display information relating to the transaction on a smart device such as a smartphone or AR glasses.

7 Claims, 40 Drawing Sheets

Related U.S. Application Data

10,997,418, said application No. PCT/IB2020/058386 is a continuation-in-part of application No. 16/565,234, filed on Sep. 9, 2019, now Pat. No. 10,699,124, said application No. 16/895,637 is a continuation of application No. 16/565,234, filed on Sep. 9, 2019, now Pat. No. 10,699,124, said application No. 16/893,236 is a continuation-in-part of application No. 16/565,234, filed on Sep. 9, 2019, now Pat. No. 10,699,124.

(60) Provisional application No. 62/966,503, filed on Jan. 27, 2020.

(56) References Cited

U.S. PATENT DOCUMENTS

| | | | | |
|---|---|---|---|---|
| 10,019,136 | B1 | 7/2018 | Ozog | |
| 10,055,714 | B2 | 8/2018 | Zhou | |
| 10,147,076 | B2 | 12/2018 | Zhou | |
| 10,521,777 | B2 | 12/2019 | Zhou | |
| 10,825,004 | B1 | 11/2020 | Walker | |
| 11,157,739 | B1 | 10/2021 | Iskandar | |
| 11,282,323 | B2 | 3/2022 | Van Horn | |
| 11,532,051 | B1 | 12/2022 | Braun | |
| 2003/0009670 | A1 | 1/2003 | Rhoads | |
| 2005/0058318 | A1 | 3/2005 | Rhoads | |
| 2005/0196013 | A1 | 9/2005 | Rhoads | |
| 2008/0204361 | A1 | 8/2008 | Scales | |
| 2008/0260210 | A1 | 10/2008 | Kobeli | |
| 2009/0078756 | A1 | 3/2009 | Oberan | |
| 2012/0299961 | A1 | 11/2012 | Ramkumar et al. | |
| 2013/0206830 | A1 | 8/2013 | Kugel | |
| 2013/0210523 | A1 | 8/2013 | Arumugam | |
| 2013/0229452 | A1 | 9/2013 | Roof | |
| 2013/0278631 | A1* | 10/2013 | Border | G06F 3/04842 345/633 |
| 2013/0335784 | A1 | 12/2013 | Kurtz | |
| 2014/0080428 | A1 | 3/2014 | Rhoads | |
| 2014/0100896 | A1 | 4/2014 | Du | |
| 2014/0340423 | A1 | 11/2014 | Taylor | |
| 2015/0117701 | A1 | 4/2015 | Ross | |
| 2015/0287290 | A1 | 10/2015 | Van Horn | |
| 2016/0085955 | A1 | 3/2016 | Lerner | |
| 2016/0133054 | A1 | 5/2016 | Honjo | |
| 2016/0140427 | A1 | 5/2016 | Keay | |
| 2016/0209648 | A1 | 7/2016 | Haddick | |
| 2016/0225192 | A1 | 8/2016 | Jones | |
| 2016/0328607 | A1 | 11/2016 | Krishnan | |
| 2016/0357406 | A1 | 12/2016 | Lee | |
| 2016/0358383 | A1 | 12/2016 | Gauglitz | |
| 2017/0032285 | A1 | 2/2017 | Sharma | |
| 2017/0094196 | A1 | 3/2017 | Adsumilli | |
| 2017/0221272 | A1 | 8/2017 | Li | |
| 2017/0249491 | A1 | 8/2017 | Macintosh | |
| 2017/0270698 | A1 | 9/2017 | Goslin | |
| 2017/0344823 | A1 | 11/2017 | Withrow | |
| 2018/0018671 | A1 | 1/2018 | Celia | |
| 2018/0089899 | A1 | 3/2018 | Piemonte et al. | |
| 2018/0114364 | A1 | 4/2018 | McPhee | |
| 2018/0174366 | A1 | 6/2018 | Nishibe | |
| 2018/0208209 | A1 | 7/2018 | Al-Dahle et al. | |
| 2018/0240220 | A1 | 8/2018 | Katori | |
| 2018/0253876 | A1* | 9/2018 | Lin | G06K 7/1413 |
| 2018/0276895 | A1 | 9/2018 | Hodge | |
| 2018/0330167 | A1 | 11/2018 | Siggard | |
| 2018/0345129 | A1 | 12/2018 | Rathod | |
| 2018/0350144 | A1 | 12/2018 | Rathod | |
| 2019/0124272 | A1 | 4/2019 | O'Neill | |
| 2019/0149725 | A1 | 5/2019 | Adato | |
| 2019/0188920 | A1 | 6/2019 | McPhee | |
| 2019/0205645 | A1 | 7/2019 | Bates | |
| 2019/0205962 | A1 | 7/2019 | Piramuthu | |
| 2019/0236594 | A1 | 8/2019 | Ehrlich-Quinn | |
| 2019/0251303 | A1 | 8/2019 | Fertakos | |
| 2019/0258204 | A1 | 8/2019 | Nelson | |
| 2019/0318168 | A1 | 10/2019 | Meier | |
| 2019/0318186 | A1 | 10/2019 | Sergott | |
| 2019/0392088 | A1 | 12/2019 | Duff | |
| 2020/0019776 | A1 | 1/2020 | Lewis | |
| 2020/0045260 | A1 | 2/2020 | Averhart | |
| 2020/0082668 | A1 | 3/2020 | Foley | |
| 2020/0089014 | A1 | 3/2020 | Peng et al. | |
| 2020/0089313 | A1 | 3/2020 | Himane | |
| 2020/0160601 | A1 | 5/2020 | Shreve | |
| 2020/0225901 | A1 | 7/2020 | Boissiere et al. | |
| 2020/0233212 | A1 | 7/2020 | Peimonte et al. | |
| 2020/0233220 | A1 | 7/2020 | Strongwater et al. | |
| 2020/0233453 | A1 | 7/2020 | Hatfield et al. | |
| 2020/0233681 | A1 | 7/2020 | Garstenauer et al. | |
| 2020/0242439 | A1 | 7/2020 | Micali | |
| 2020/0394012 | A1 | 12/2020 | Wright, Jr. | |
| 2021/0004802 | A1 | 1/2021 | Rule | |
| 2022/0391867 | A1 | 12/2022 | Glaser | |

OTHER PUBLICATIONS https://appleinsider.com/articles/20/07/23/apple-plans-to-dominate-all-aspects-of-ar-with-apple-glass-and-more.

International Search Report (PCT/ISA/220 & PCT/ISA/210) and Written Opinion (PCT/ISA/237) issued in PCT Application No. PCT/IB2020/058386 dated Feb. 1, 2021 (19 pages).

U.S. Appl. No. 17/641,300.

U.S. Appl. No. 17/689,900.

U.S. Appl. No. 17/689,903.

U.S. Appl. No. 17/689,904.

U.S. Appl. No. 17/689,906.

U.S. Appl. No. 17/689,911.

U.S. Appl. No. 17/689,912.

U.S. Appl. No. 17/689,913.

U.S. Appl. No. 17/689,917.

U.S. Appl. No. 17/689,920.

U.S. Appl. No. 17/689,923.

U.S. Appl. No. 17/689,926.

U.S. Appl. No. 17/689,929.

U.S. Appl. No. 17/689,931.

U.S. Appl. No. 17/689,933.

Jan. 4, 2024 Office Action in U.S. Appl. No. 18/095,866.

Aug. 23, 2023 Office Action in U.S. Appl. No. 17/641,300.

extension://oemmndcbldboiebfnladdacbdfmadadm/https://www.konzerthaus.de/media/filer_public/7e/28/7e288b33-64db-45be-89b8-9cf03f20c9fa/downloadpaket_digitale_ausstellung_englisch.pdf "AR supplement Konzerthaus Plus", "Digital Exhibition", Berlin Konzerthaus (2018).

https://arcms.f4.htw-berlin.de/PrintMarker/en/kh_sb_2018.pdf "AR supplement Konzerthaus Plus Season Brochure 2018/19" (2018).

https://apps.apple.com/us/app/konzerthaus-plus/id1218227009 "Konzerthaus Plus" App on Apple iStore, version 2.1.1 Konzerthaus Berlin (May 31, 2018, Aug. 20, 2019).

* cited by examiner

Flyer

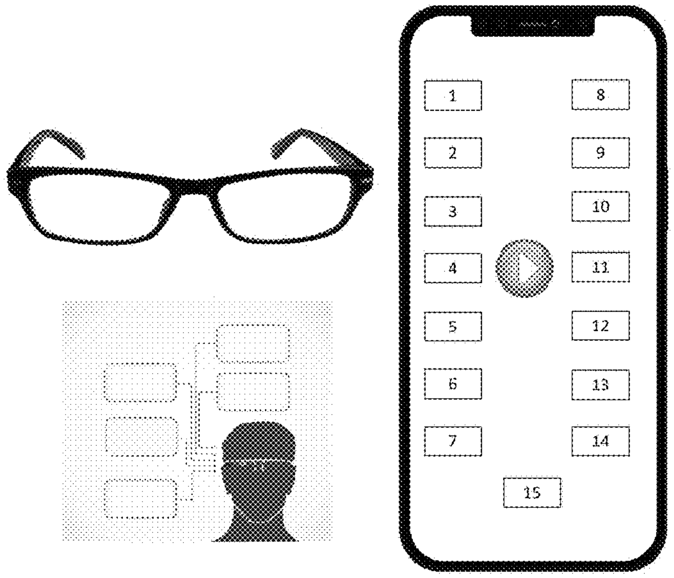

Fig. 1

Description of potential buttons/ calls to action

1. Price Tag
2. Photo Gallery
3. Videos
4. Description
5. Call
6. Mail
7. Shop link
8. Explanation
9. Intro
10. Social Media links
11. Map
12. Discount Codes
13. Reviews
14. Tutorials
15. Directions
16. Test drives
17. Booking opportunities
18. ...

Summary

Within the use case, several buttons can be shown on a mobile phone screen, a monitor, contact lens or AR Glasses.

Pointed on, or looking at a flyer, AR will be displayed which can show multiple information, videos, links, shop links, or specific calls to action, etc. - depending on the product, service or topic that is shown on the flyer.

102a

102b

102c

102f

102g

102h1

102h2

Figure 6A
202
406
210
PASSPORT
United States
of America

Figure 6B
202
406
210
406
PASSPORT
INAUGURAL NOTE

Figure 7A
LIQUID I.V. HYDRATION MULTIPLIER
30-PACK RESEALABLE POUCH
Item #1267379. Warehouse/Costco.com.
DIXIE ULTRA® 20-OZ. BOWLS
135-COUNT
Item #296917.
Warehouse/Costco.com.
Bounty
ADVANCED
BOUNTY ADVANCED
PAPER TOWELS
Item #1258929/#1258930.
Warehouse/Costco.com.
35 CANS
COCA-COLA® ZERO SUGAR
Item #891742. Warehouse only.
WHAT'S YOUR GAME PLAN?
WHETHER IT'S A PARTY WITH LOTS OF FRIENDS, A SMALL INTIMATE
GATHERING OR A BLOCK PARTY WITH THE WHOLE NEIGHBORHOOD,
COSTCO HAS YOUR BIG GAME PARTY NEEDS COVERED.
CROCK-POT 7-QUART COOK & CARRY
STAINLESS STEEL SLOW COOKER
Item #1316457.
Warehouse/Costco.com.
LIFETIME FOLDING CHAIR
$3.00 off 1/06/20–1/26/20.
Instant savings taken at checkout.
Limit 4. Item #1358064. Warehouse only.
VITAMIX E320 BLENDER WITH 2
20-OZ. PERSONAL TO-GO CUPS
Item #1227836.
Warehouse/Costco.com.

Figure 7B
LIQUID I.V. HYDRATION MULTIPLIER
30-PACK RESEALABLE POUCH
Bounty
ADVANCED
BOUNTY ADVANCED
PAPER TOWELS
DIXIE ULTRA® 20-OZ. BOWLS
135-COUNT
Warehouse/Costco.com.
Coca-Cola
ZERO SUGAR
Warehouse only.
WHAT'S YOUR
PLAN?
Area of
recognition
WITH THE WHOLE NEIGHBORHOOD.
COSTCO HAS YOUR BIG GAME PARTY NEEDS COVERED.
CROCK-POT 7-QUART COOK & CARRY
STAINLESS STEEL SLOW COOKER
Warehouse/Costco.com.
LIFETIME FOLDING CHAIR
Instant savings taken at checkout.
Warehouse only.
VITAMIX E320 BLENDER WITH 2
20-OZ. PERSONAL TO-GO CUPS
Warehouse/Costco.com.

Figure 7C
LIQUID I.V. HYDRATION MULTIPLIER
30-PACK RESEALABLE POUCH
BOUNTY ADVANCED
PAPER TOWELS
DIXIE ULTRA® 20-OZ. BOWLS
135-COUNT
Warehouse/Costco.com.
COCA-COLA® ZERO SUGAR
WHAT'S YOUR GAME PLAN?
WHETHER IT'S A PARTY WITH LOTS OF FRIENDS, A SMALL INTIMATE
GATHERING OR A BLOCK PARTY WITH THE WHOLE NEIGHBORHOOD,
COSTCO HAS YOUR BIG GAME PARTY NEEDS COVERED.
CROCK-POT 7-QUART COOK & CARRY
STAINLESS STEEL SLOW COOKER
LIFETIME FOLDING CHAIR
Instant savings taken at checkout.
VITAMIX E320 BLENDER WITH 2
20-OZ. PERSONAL TO-GO CUPS

Figure 8A
NORWEGIAN
CRUISE LINE
BUYER'S CHOICE CRUISES
• Choose from exciting itineraries
• Exclusive extras for Costco members:
- Phone and internet package
- $50 Spa credit for two
- Bingo package and Casino Play for two
- Bottle of wine and chocolate covered strawberries
• Plus, enjoy your choice of unlimited open bar, specialty dining, shore excursion credits and more!
Celebrity Cruises
Italy and Best of Greek Islands Cruise
EXPERIENCE EUROPE'S TIMELESS HISTORY, CULTURE AND ROMANCE.
2% 3%
CLICK TRAVEL AT COSTCO.COM | 1-877-849-2730
Costco travel

Figure 9B
NORWEGIAN
CRUISE LINE
BUYER'S CHOICE
CRUISES
• Choose from exciting itineraries
• Exclusive extras for Costco members
Phone and internet package
$50 Spa credit for two
Bingo package and Casino Play for two
Bottle of wine and chocolate-covered strawberries
• Plus, enjoy your choice of unlimited open bar, specialty dining, shore excursion credits and more!
Celebrity Cruises
Italy and Best of Greek Islands Cruise
EXPERIENCE EUROPE'S TIMELESS HISTORY, CULTURE AND ROMANCE
2%
3%
CLICK TRAVEL AT COSTCO.COM | 1-877-849-2730
Costco
travel

FIND GREAT AVIATION JOBS WITH EXCELLENT BENEFITS AT AAR

09 FEBRUARY 2017 PAT SMITH AVIATION JOBS, JOB SEARCH, NEWSLETTER, SPECIAL EVENTS

LET YOUR CAREER TAKE FLIGHT

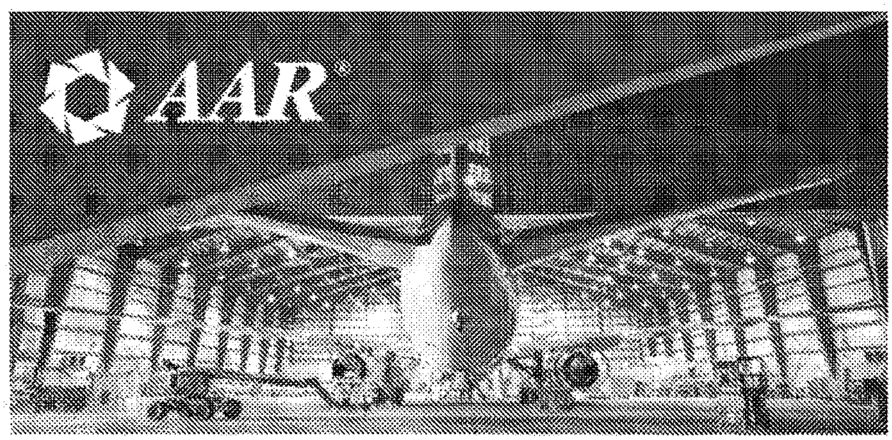

FIND GREAT AVIATION JOBS WITH EXCELLENT BENEFITS - AT AAR

APPLY TODAY.

AAR Aircraft Services, the largest independent MRO provider in North America, has immediate job openings and is conducting interviews for:

> A/P, S/M, R/E Technicians and Inspectors
> Lead A/P, S/M, R/E and Lead Inspectors
> Supervisory positions (3+ years of experience required)
> Project Manager positions (7+ years experience required)

The positions are located in:

> Rockford, IL
> Miami, FL
> Duluth, MN
> Indianapolis, IN
> Oklahoma City, OK

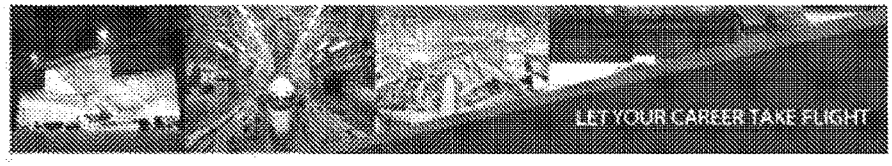

FIND GREAT AVIATION JOBS–WITH EXCELLENT BENEFITS–AT AAR

AAR Aircraft Services, the largest independent MRO provider in North America, has immediate job openings ar is conducting interviews! Apply Today.

Figure 12

AUGMENTED, VIRTUAL AND MIXED-REALITY CONTENT SELECTION AND DISPLAY FOR FLYERS

CROSS-REFERENCES TO RELATED APPLICATIONS

This application is a continuation in part of application Ser. No. 17/228,821 filed Apr. 13, 2021, which is a continuation of application Ser. No. 16/895,637 filed Jun. 8, 2020 now U.S. Pat. No. 10,997,419; which is a continuation of application Ser. No. 16/565,234 filed Sep. 9, 2019 now U.S. Pat. No. 10,699,124.

This application is also a continuation in part of application Ser. No. 17/228,814 filed Apr. 13, 2021, which is a continuation of application Ser. No. 16/893,236 filed Jun. 4, 2020 now U.S. Pat. No. 10,997,418; which is a CIP of Ser. No. 16/565,234 filed Sep. 9, 2019 now U.S. Pat. No. 10,699,124; and which claims the benefit of 62/966,503 filed Jan. 27, 2020.

This application is also a continuation in part of U.S. patent application Ser. No. 17/641,300 filed Mar. 8, 2022, which is a US national phase of PCT International application no. PCT/IB2020/058386 filed 9 Sep. 2020, which is a continuation in part of application Ser. No. 16/893,236 filed 4 Jun. 2020 and is a continuation in part of application Ser. No. 16/565,234 filed 9 Sep. 2019 and claims the benefit of application No. 62/966,503 filed 27 Jan. 2020.

Each of these applications is incorporated herein by reference in its entirety as if expressly set forth.

STATEMENT REGARDING FEDERALLY SPONSORED RESEARCH OR DEVELOPMENT

None.

BACKGROUND & SUMMARY

Augmented reality ("AR") is the real-time superimposition of artificial images onto real world images. This technology has been used for a variety of applications from handheld entertainment to heads-up displays on military jets. For example, a person using an augmented reality-enabled display device (e.g., a smartphone with an AR app or AR enabled glasses) while shopping can be shown virtual advertisements, sale announcements, pricing information etc. superimposed onto images of actual products they can purchase.

Because AR tends to drive higher levels of attention, one advantageous use of augmented reality is superimposing advertisements and/or purchasing information over product images. People who might ignore traditional electronic advertisements may pay attention to an AR advertisement.

BRIEF DESCRIPTION OF THE DRAWINGS

FIG. 1 shows an example non-limiting flyer information access system.

FIG. 12 shows an example employment listing.

DETAILED DESCRIPTION OF EXAMPLE NON-LIMITING EMBODIMENTS

Figure 1A:
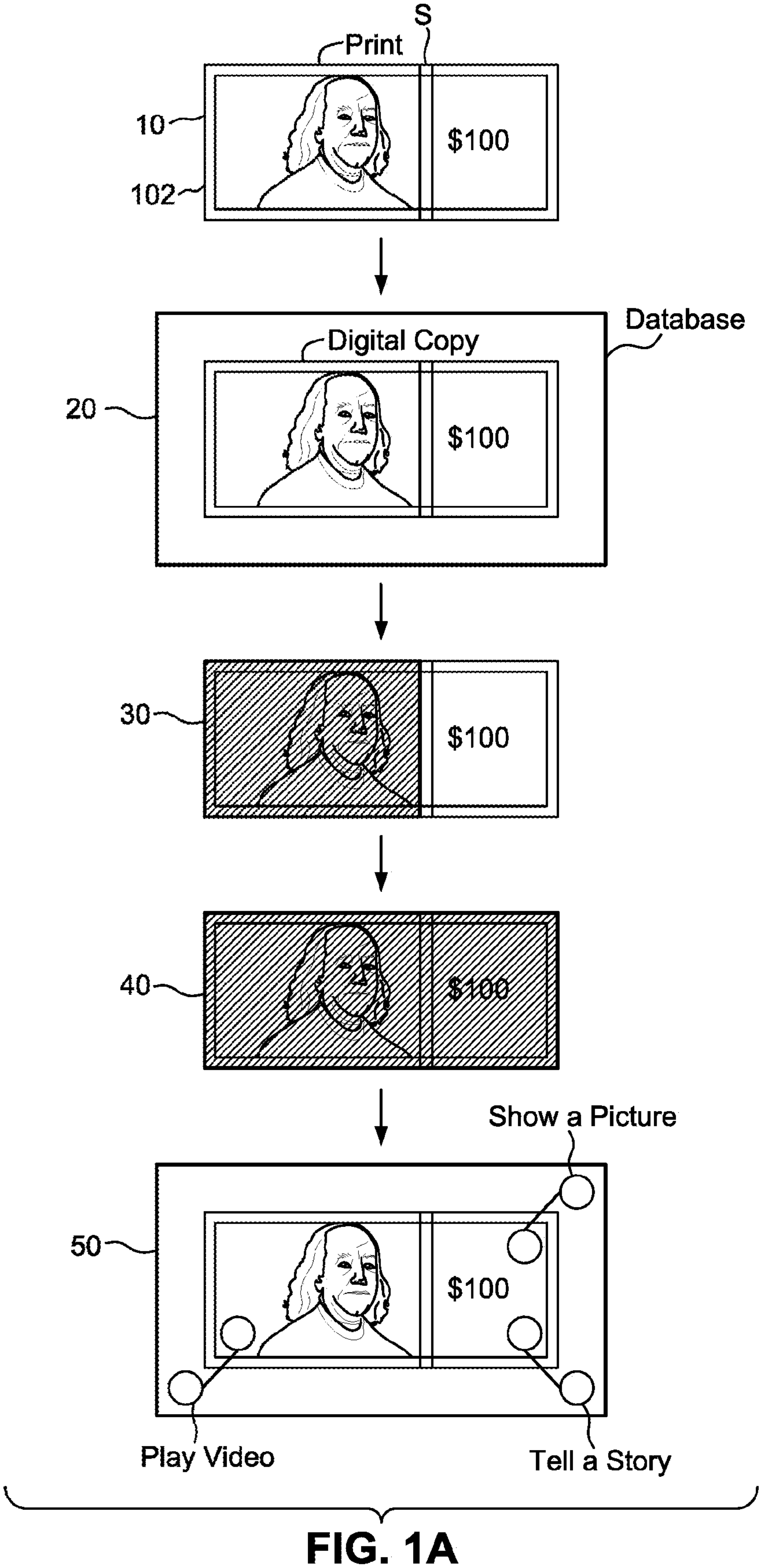
FIG. 1A is an example process flow diagram.
Figure 1B:
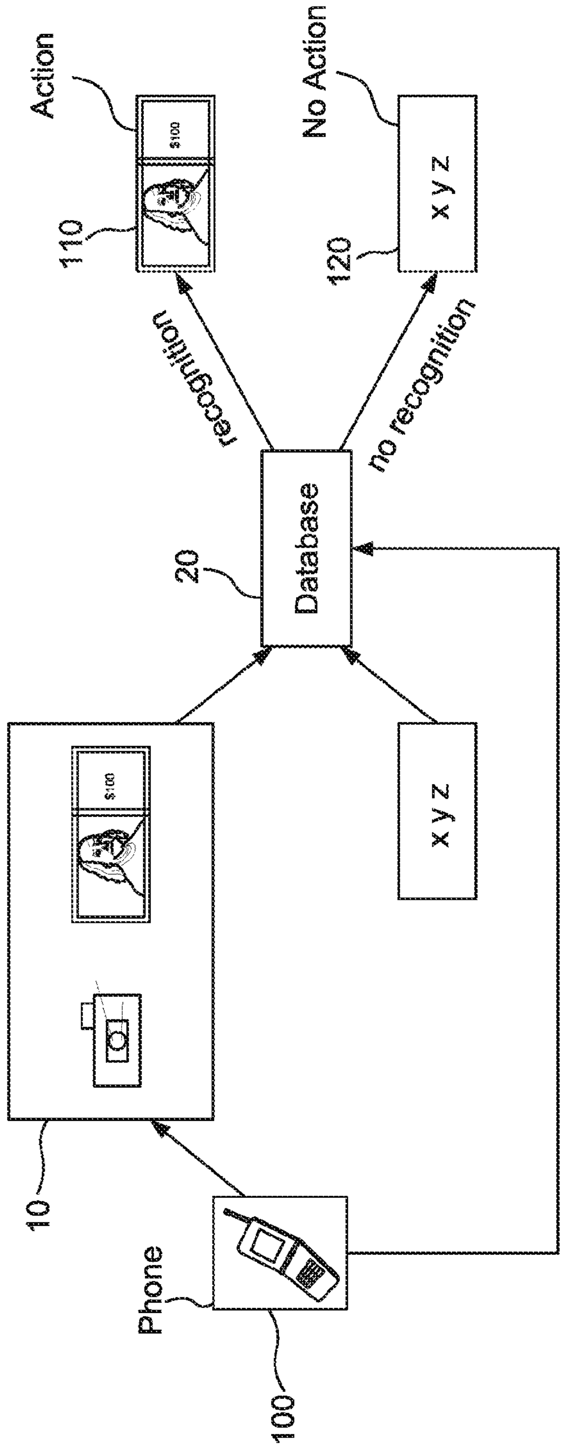
FIG. 1B shows an example branching process.
Figure 1C:
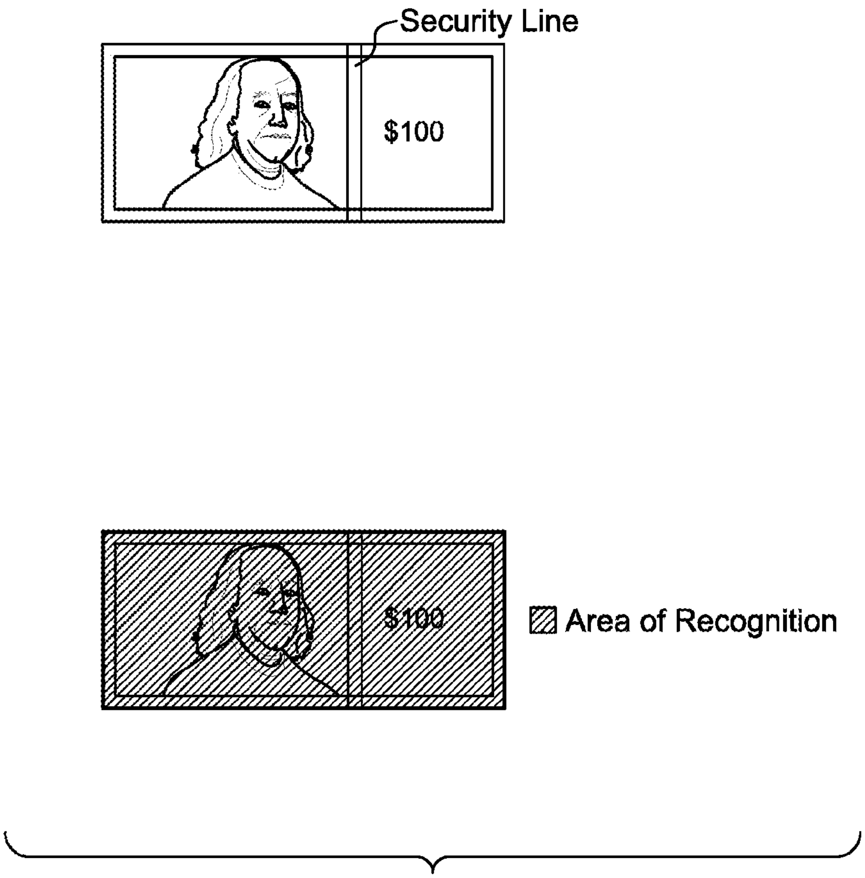
FIG. 1C shows an example area of recognition.
Figure 1D:
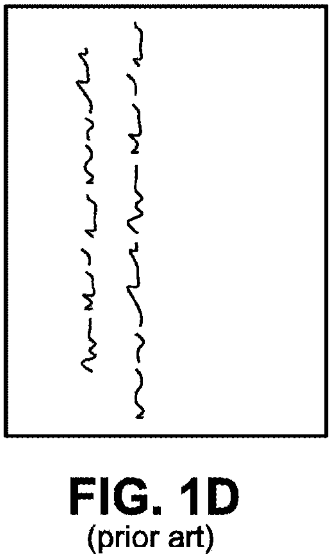
FIG. 1D (prior art)
FIG. 1D shows a prior art hidden signature.
Figure 1E:
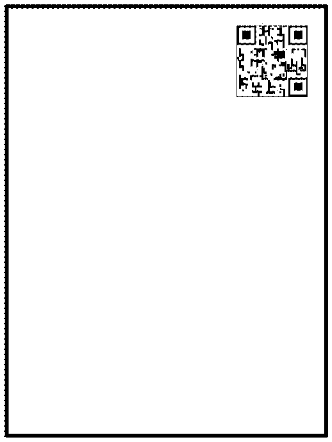
FIG. 1E (prior art)
FIG. 1E shows a prior art QR barcode.
Figure 1F:
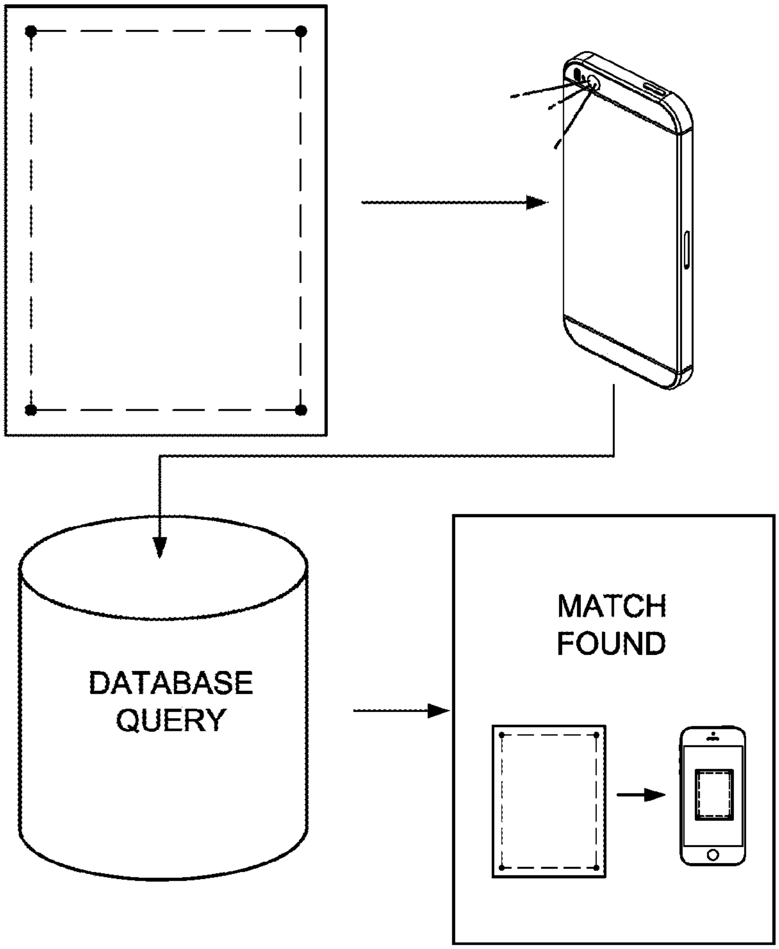
FIG. 1F shows a flexible area of recognition.
Figure 2A:
FIGS. 2A-2J show example items to be recognized.
Figure 2B:
Figure 2C:
Figure 2D:
Figure 2E:
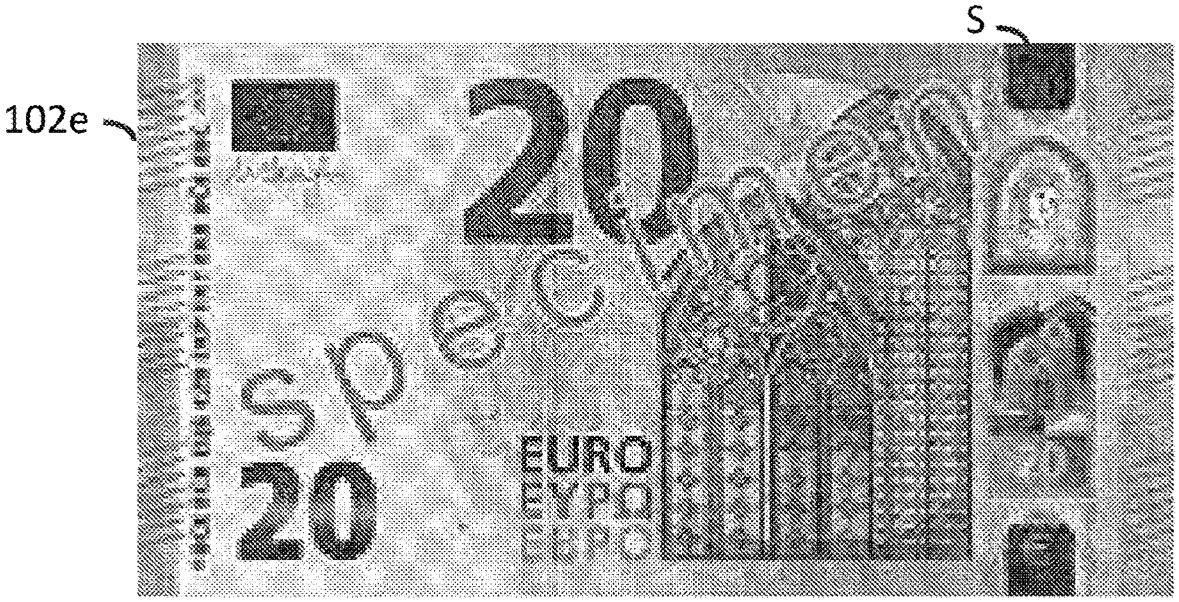
Figure 2F:
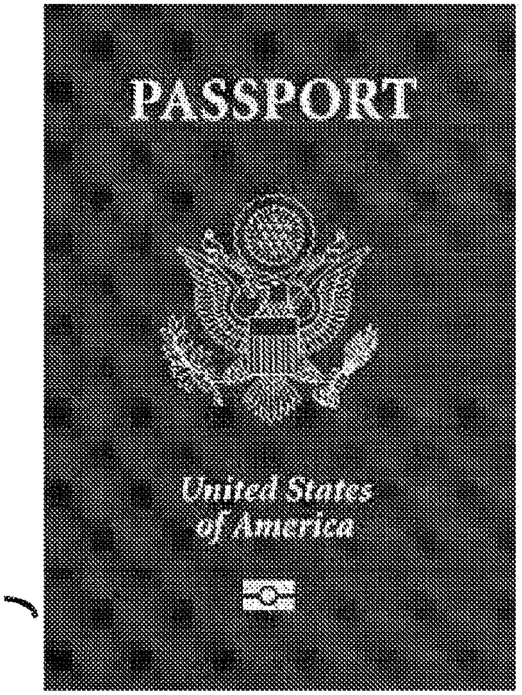
Figure 2G:
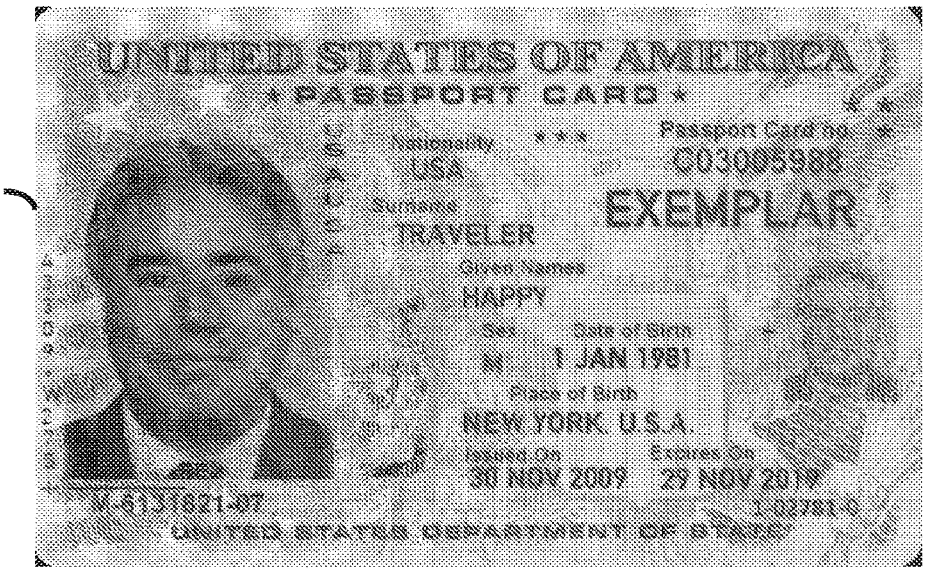
Figure 2H:
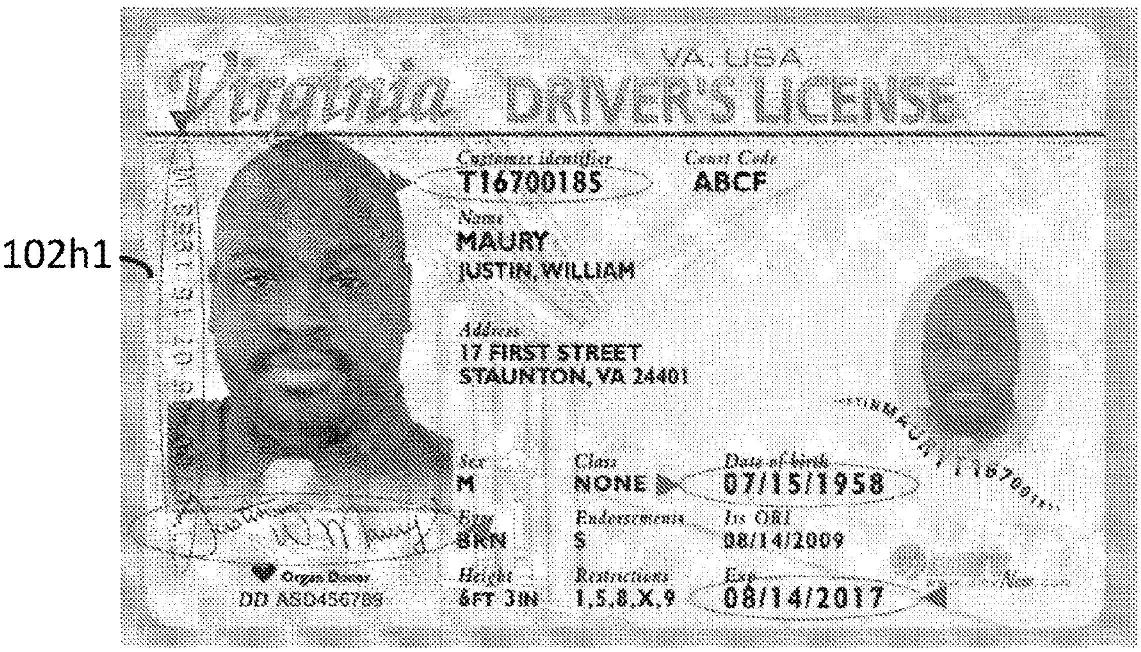
Figure 2I:
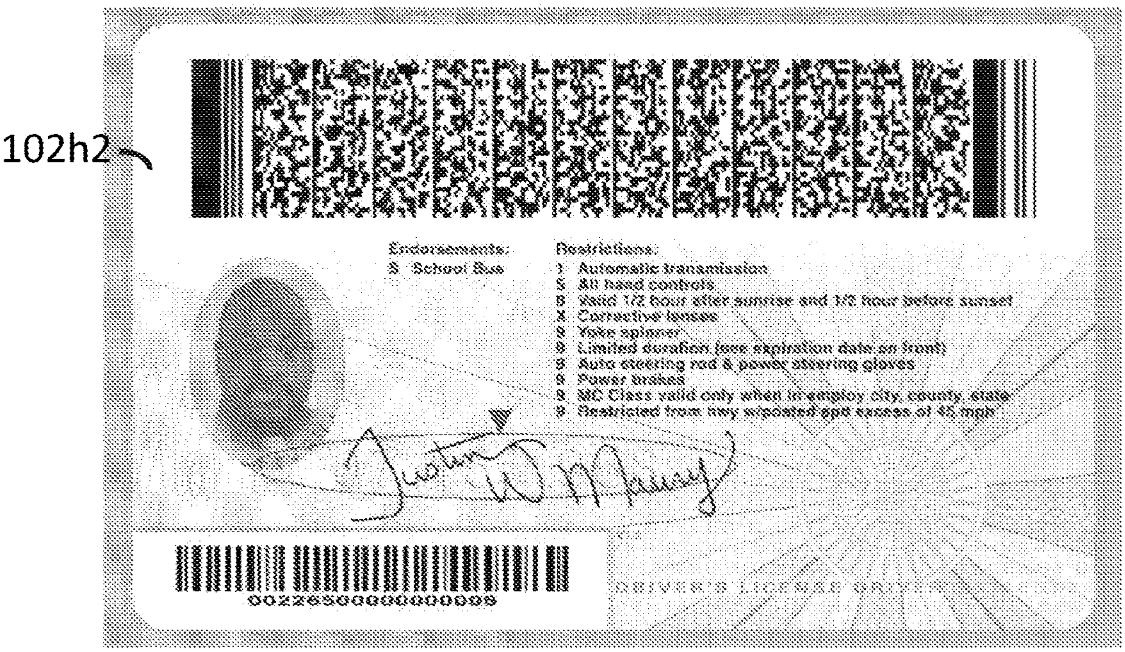
Figure 2J:

This technology provides systems, methods and techniques for automatically recognizing two- or three dimensional real world objects such as printed objects (e.g., 3 dimensional with any kind of print as example on the package of a product) with an augmented reality display device. The printed object (which may comprise a traditional printed advertisement or other printed item) can be recognized and used to trigger a superimposed digital overlay, which then opens up new options such as adding videos, live streams, buying options or other information and content. The AR feature can thus be used to augment or enhance the display of such real world objects by superimposing virtual images such as a still or video advertisement, a story, a tutorial, specific information, a shopping opportunity, or other virtual image presentation.

In the near future, when AR becomes really popular with any kind of glasses or other viewing arrangement, we might also see at least a partial replacement of the smartphone. That means that we will see many new use cases that use AR or mixed reality to provide users or customers with new information, any kind of content or buying options triggered by the recognition of a print that could be a 2 or 3 dimensional object. For example, if you see a job advertisement, with your AR glasses or a handheld device you can watch a related video or activate a call button to talk to somebody from human resources (HR) of that company. When you see a travel advertisement, you point the camera or other viewing device on this and you can watch a video of the destination, a buy option or different dates etc. or talk to a travel agent. When you see an advertisement of a product, you can decide to watch a related video, get other product information or buy it. This same scenario can exist with a product or service manual that could be the trigger of specific information that will allow you to understand how a product works by giving you technical drawings etc. This same scenario could apply in the real estate market where you can see a video of the object, specific information such as the price or price history, the neighborhood, floorplan, a call button to call the agent etc. This same scenario could apply with tickets where there is a city light as a trigger and when the AR kicks in, you can buy this ticket for a concert, a sport event etc. It could be that specific information about that concert or event can be provided to motivate customers to purchase. That could be videos or other specific information about players, a track record, etc. In one example embodiment, a device enables or allows superimposition of a digital overlay that leads to specific action such as providing specific information; providing videos, tutorials, or any kind of content; providing options to buy; or other options.

Another use case could be in a vehicle, where the passengers see digital advertisements on their screens or windows triggered by the recognition of advertisements like posters, citylights etc. that had been recognized by a camera that is attached to the vehicle.

In some non-limiting embodiments, the real world object may include visible features including visible security features and a recognition process takes the visible security features into account when recognizing the object and/or displaying superimposed virtual images. But security features are not needed or used in other example embodiments herein.

Example Use Case—Flyer Information System

FIG. 1 shows an example flyer information system. In the example shown, a smart device such as a smart phone or smart glasses captures and recognizes printed information from a real world object such as a flyer or brochure. The real world object could comprise a two-dimensional printed advertisement on a page in a newspaper or magazine, a 2D electronic display or rendering of such an advertisement, an individual page that may or may not be folded imprinted with images and/or text, etc.

As described below, the system will automatically recognize the real world flyer object and match it up with one or more entries or records such as in a database that pertain to a particular product or service associated with or comprising the real world object of a flyer. Such a database entry or record may be stored in the cloud and accessed over an electronic wireless network or in some cases an electronic or digital wired network.

Within this system, several buttons can be shown on a mobile phone display or a monitor or on AR Glasses. In this real estate example, each of the buttons shows a call for action.

In more detail, once a flyer is recognized, the system can display any or all of the following action buttons in any combination to allow a user to access selected kinds of further information related to or associated with the particular product, service or other aspects of its being offered for sale, rent or trade on the flyer:

1. Price Tag
2. Photo Gallery
3. Videos
4. Description
5. Call
6. Mail
7. Shoplink
8. Explanation
9. Intro
10. Social Media links
11. Map
12. Discount Codes
13. Reviews
14. Tutorials
15. Directions
16. Test drives
17. Booking opportunities
18. Other.

In this example, selecting the "price tag" button causes display of or otherwise presents information relating to the financial aspects of a transaction relating to the recognized flyer. The information that is displayed could comprise for example asking price, price history, prices of comparable items, prices of the item at different retail outlets, down payment or security deposit, financing options, estimated transaction costs, comparable value, tax liability or payments, reputation of the supplier/manufacturer, other.

Selecting the "photo gallery" button can cause display of one or more photographs or other images such as orthographic or panoramic images relating to or showing the goods or services associated with the flyer. There can be interior views, exterior views, perspective views, birds eye views, map views, architectural drawings, plan view drawings, neighborhood photos, 3D photos, views of food, views of people using the product or enjoying the service, other photos.

Selecting the "Videos" button can cause display of one or more videos or other moving picture presentations pertaining to the goods or services or other item such as a video tour, a sales pitch, testimonials, stories, music videos, dance videos, documentaries, or other.

Selecting the "Description" button can cause display or other presentation of textual or written information or audio information describing characteristics of the goods, services or other items associated with the recognized flyer. Such information can include a description written by a seller describing salient features of the item or items associated with the flyer such as price or cost, size, weight, availability, location, ingredients, operating hours, dietary information, plot description, performance nights, reputation information, etc.

Selecting the "Call" button can cause the smart device to place a voice call, voice chat or text chat with a seller involved in selling or offering a good or service associated with or advertised by the flyer.

Selecting the "Mail" button can cause the smart device to generate an email, text, tweet, chat or other asynchronous electronic communication to send to the seller or offer or related to the flyer or to invite such an individual or entity to contact the device by electronic or physical mail.

Selecting the Shoplink button can cause the smart device to shop for a good or service related to a message on the flyer. For example, if a flyer displayed a political campaign message, selecting the "Shoplink" button could bring up an online opportunity to financially or otherwise support the political campaign. And if the flyer showed a restaurant, car or a washing machine, the "Shoplink" button could bring up the restaurant, sales outlets who could offered the car or washing machine for sale, etc.

Selecting the "Explanation" button can cause the smart device to provide an explanation with regards to the item or service shown on the flyer. This could focus on all kinds of information such as history or reputation of the manufacturer, product ratings, list of product features, etc.

Selecting the "Intro" button can cause the smart device to provide an introduction of the item or service indicated on the flyer with some crisp facts and figures. It can also be used for an introduction of the product, the manufacturer or the seller.

Selecting the "Social Media Links" button can cause the smart device to initiate contact(s) via social media with the seller or other individuals associated with or related to buying or selling or offering the product indicated on the flyer, display community or neighborhood social media pages, user groups, or the like.

Selecting the "Map" button can cause the smart device to display a map showing the geographical locations of the retail outlet, concert venue, campaign headquarters, or other venue or location associated with a product and/or service indicated on the flyer.

Selecting the "Discount Codes" button can bring up a display of discount codes or coupons that could be applied for an online or in-person purchase of a good or service indicated on the flyer.

Selecting the "Reviews" button can bring up on the smart device a listing of reviews posted by others in connection with the product or service shown on the flyer. For example, the "Reviews" associated with a flyer advertising a restaurant could be of other customers of that restaurant commenting on the food sold by the restaurant. The "Reviews" associated with a flyer advertising a water park could show posted online reviews of others who have visited the water park. Note that these reviews could have been written and posted before the flyer had been printed, posted or otherwise created.

Selecting "Tutorials" could bring upon on the smart device one or more tutorials concerning how to use, operate or experience the product or service indicated on the flyer.

Selecting "Directions" could bring up on the smart device driving or walking directions to get to an outlet associated with the flyer, e.g., a restaurant, car dealership, water park, sports arena, etc.

Selecting "test drives" could bring up on the smart device a series of videos or other presentations showing other users using the product or service shown on the flyer, or it could in some embodiments enable the user of the smart device to schedule an opportunity to "test drive" the product or service.

"Booking opportunities" when selected could bring up on the smart device an opportunity to book an experience or accommodation such as a cruise, a hotel room, a theater performance, etc.

As discussed below, the presentation of any or all such information may be by superimposing the information onto an image of the recognized real world object that is inscribed with printed material. Thus, the user of the smart device can view the image of the flyer on their smart device with information superimposed thereon.

Figure 18A:
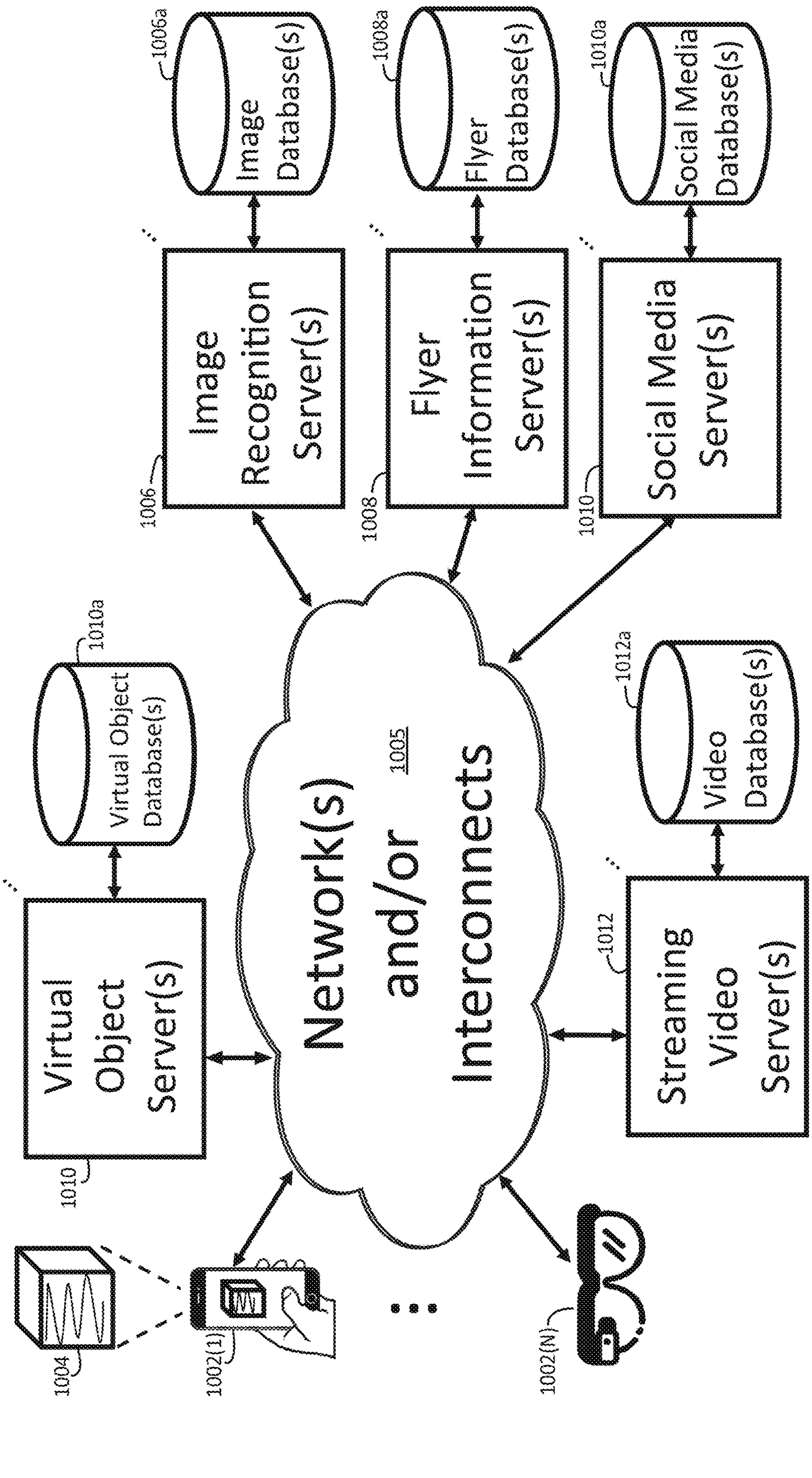
FIG. 18A shows an example system block diagram.
Figure 18B:
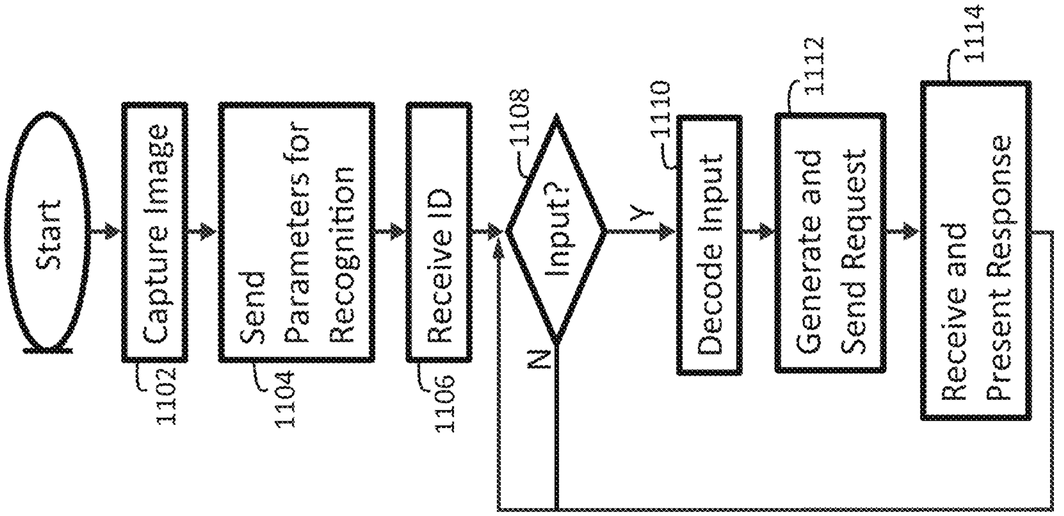
FIG. 18B shows an example flowchart.

Such additional information presented as described above may be electronically retrieved and presented by the smart device from a database, server or other source in the cloud. In particular, FIGS. 18A and 18B show one example non-limiting implementation. The FIG. 18A system shows how a handheld or worn smart device 1002 can communicate via a network 1005 with a variety of resources such as an image recognition server(s) 1006, an information server(s) 1008, a social media server(s) 1010, a streaming video server(s) 1012, a virtual object server(s) 1014, and other resources. As FIG. 18B shows how the handheld or worn smart device 1002 can capture an image (block 1102) and send captured parameters and/or images to the image recognition server(s) 1006 for processing (block 1104). In example embodiments, the system translates every captured image into shades of grey or color plus have an area of recognition that can be defined as the whole image or just a part or several parts of the image. In example embodiments, the flyer can provide a static display or a changing display comprising a sequence of images, and the example embodiment recognizes any one or of a sequence of such images.

The image recognition server(s) 1006 recognizes the captured image and sends back an identifier to the smart device 1002 (block 1106). This identifier in one embodiment can comprise more than one identifier that allows the smart device 1102 to provide indices or references to allow the smart device to request related information from other services shown in FIG. 18A. For example, the image recognition server(s) 1006 may send back URLs, geographical address strings, zipcodes, neighborhood names, geocoordinates, search strings or codes, or other identifiers. The smart device 1102 can use such information to pull information relating to the item 1104 identified by the image recognition server(s) 1006 from the various servers 1006, 1008, 1010, 1012, 1014 based on which button shown in FIG. 1 a user selects. Which button is selected thus determines not only the type of information the smart device 1102 requests, but also the source of the information.

Example Use Case—Financial or Other Instrument

FIG. 1A shows a further example non-limiting process. At 10, a printed, engraved, stamped or other object 102 such as a banknote, coin or ID (see FIGS. 2A-2J) is scanned to produce a digital copy. Such scanning can be performed with a camera, a CMOS light sensor, a document scanner, or any other conventional device that creates a digital image of the printed object.

The printed object may include visible features such as distinctive images of persons, buildings, etc. In the example shown, the printed object further includes an example visible security feature S represented here as a vertical band. The scanned digital copy will include the distinctive image(s) as well as the visible security feature S.

At 20, the resulting digital copy of the printed object is uploaded into a database, and enhanced to provide a selected associated overlay comprising: (a) self-starting video(s) and/or video(s) that start when you physically press a button that has been programmed to show up on the surface of a device like a mobile phone, iPad etc., or activate this activity by voice, movements of your head and/or gesture; (b) button(s) that when selected have different interactive functions such as "tell a story"; and (c) interactive connection to an online shopping experience e.g., to show a store finder (see 50).

Overlay can be Changed Dynamically

We can change the digital "overlay" quickly if needed (e.g., to change from one advertising campaign to another) or update content, price tags, videos or other information. The technology of embodiments herein allows an update of the digital overlay in a split second—which is must faster as compared to many other systems. The disclosed embodiments allow split seconds updates by uploading a new digital overlay or even a new button into the data base. With other technologies that used a QR code, a particular media content was tied to the QR code so the distributor of the content would have to print a new QR code on a new flyer to play out a different experience. With the system of embodiments herein, you just change either the whole digital overlay or a part or some parts of the digital overlay and as soon as the camera detects a print that is connected with this image stored in the data base, the user see the updated overlay in a split second. No hidden pattern, print etc. is needed.

Old or Ancient Media can be Retrofitted

By way of further explanation, if you would use a piece of print that is 50 years old, it would not contain a QR code, a hidden signature etc. Therefore it would be impossible to use this to play out an AR experience using systems that require a bar code. With the technology herein in some embodiments, you upload the old print into the database and connect a digital overlay to it. As soon as this has happened, the print stored in the database will match with the Cameras recording and the digital overlay will be played. This means that publications of any vintage (e.g., older magazines, books, flyers, etc.) can also be recognized and used to provide modern media overlays.

Workflow to Update AR Experience

Another differentiator is the workflow to update an AR experience. All systems that work with a QR code FIG. 1E) or hidden signatures (FIG. 1D) need either a new QR code or another print to connect with a new, updated experience. With the technology herein, you change or update the digital overlay and leave the original print untouched (see FIG. 1F). That means that you can update an experience without producing a new QR code or print new prints with a new hidden signature.

Area of Recognition

To activate that overlay, we determine an "area of recognition" as indicated by a cross-hatched area (30). In one example embodiment, the area of recognition is determined at least in part by the presence, position, dimensions and/or orientation of one or more security features S. For example, the area of recognition may be defined to exclude the security feature S on the printed object. As an example, in the case of a 20 Euro note (see FIG. 2E) including a vertically-oriented silver holographic band which appears differently depending on the viewing angle, the "area of recognition" may defined to exclude the silver holographic band so the system is able to recognize the object even without a silver line. Similarly, the area of recognition in the case of a $100 US banknote shown in FIG. 2C may be defined to exclude security features B, C and E since at least some of these features may appear differently depending on viewing angle (e.g., the ink color changes from gold to green as viewing angle changes). Other security features such as serial numbers, bar codes etc. vary from one printed document to another, so that using such indicia will result in no recognition of a banknote of the same denomination but having a different unique serial number and/or unique bar code (i.e., the purpose of the recognition may be to recognize a particular kind of banknote, not that specific one-of-a-kind banknote). Excluding such security features from the area of recognition makes recognition more robust because it is not subject to such constraints.

The recognition of a specific area then triggers a digital overlay that includes defined features (video, information, content, shopping, etc.) that show up and can be used by a person to get information, see a video, shop etc.

Optional Recognition of Security Feature(s)

In another embodiment at 40, at least some security features S are included in the defined area of recognition. The object is recognized only if it includes the security feature(s). If there are visible security features, we can include them into our recognition program. When we upload the digital copy of a print, we can decide which area of the print is used for recognition. See FIG. 1C. When this area of recognition includes an example such as the silver line of a banknote, the note cannot be recognized when the silver line is missing. In this embodiment, the security feature S is used as a feature of recognition to increase the reliability of the recognition to recognize distinctive documents, while designing the recognition algorithm to take different viewing angles into account. For example, it is possible to include the position and orientation of a silver holographic band in an area of recognition without requiring the holographic contents of the band to be recognized. Similarly, it is possible to include the position of serial numbers or bar codes in an area of recognition without requiring the specific serial numbers or bar code contents to match.

Overlapping Areas of Recognition

Some embodiments provide plural overlapping areas of recognition for the same object; one area of recognition may exclude certain security features and another area of recognition includes those security features. The plural different overlapping areas of recognition can be applied sequentially or simultaneously to increase recognition reliability. A voting algorithm can be used to select positive matches.

Real Time Recognition Database

In example non-limiting embodiments, the database enables real time recognition of an image captured by a user. For example, if the user captures an image of a 20 Euro note, a matching algorithm is used to determine a positive match if the database contains a digital copy of a 20 Euro note. In example non-limiting embodiments, the matching algorithm can include pattern recognition techniques such as described in Conti et al, Multiresolution image registration, Proceedings, International Conference on Image Processing (IEEE 23-26 Oct. 1995); Hasanuzzaman et al, Robust and effective component-based banknote recognition by SURF features, 20th Annual Wireless and Optical Communications Conference (IEEE 15-16 Apr. 2011); Doush et al, Currency recognition using a smartphone: Comparison between color SIFT and gray scale SIFT algorithms, Journal of King Saud University—Computer and Information Sciences Volume 29, Issue 4, October 2017, Pages 484-492.

As will be understood by those skilled in the art, the database 20 could but need not contain the captured images themselves. For example, in some embodiments, the database might contain compressed or other feature sets used for comparing with captured photos, such feature sets for example comprising a listing of coordinates and associated image features to thereby reduce storage requirements and increase recognition speed. Similarly, when a smart device captures an image, instead of uploading the entire image it may analyze the image and upload a compressed format such as coordinates of pattern features. Since the purpose of recognition in the example non-limiting embodiment is not to determine whether the banknote or other printed item is authentic and genuine, the matching/recognition standards can be significantly relaxed and thus quite different as compared to conventional banknote scanners/recognizers.

Other Pattern Recognition Techniques

Some example embodiments use artificial intelligence and machine learning to perform the matching. The training set consists of images captured by various smartphones and other user devices. Other embodiments use simpler pattern recognition algorithms based on color and/or grey scale information in the area(s) of recognition. Any given object can have at least one and as many as N different discrete areas of recognition, where N is a positive integer.

Flexible Definition of Areas of Recognition

Example embodiments provide techniques to flexibly define areas of recognition. Example embodiments also do not need a restricted area of recognition. The technology described herein can cover certain points within the print, the whole object, parts of the objector or all of this. Some other technologies cannot identify an object if a restricted area of recognition is covered, as for example by a price tag. See FIGS. 4D, 4E. Embodiments herein may simply ignore this because they do not need a restricted area of recognition. See FIG. 4F.

The technology herein allows a wide variation in the definition of an area of recognition. It could be very small or as big as the object itself, it could be just one or several areas etc. Such technology also allows recognition of an item if it has different sides, like a 3D object. That means that if multiple or all sides of a 3D object are imprinted with different print on each side, we can define an area of recognition for each side to recognize the specific object even if it shows a random or unpredictable side when the user points a camera at it. A repositioning to successfully detect and recognize the object is generally not needed.

Example Cloud Based System

Figure 3:
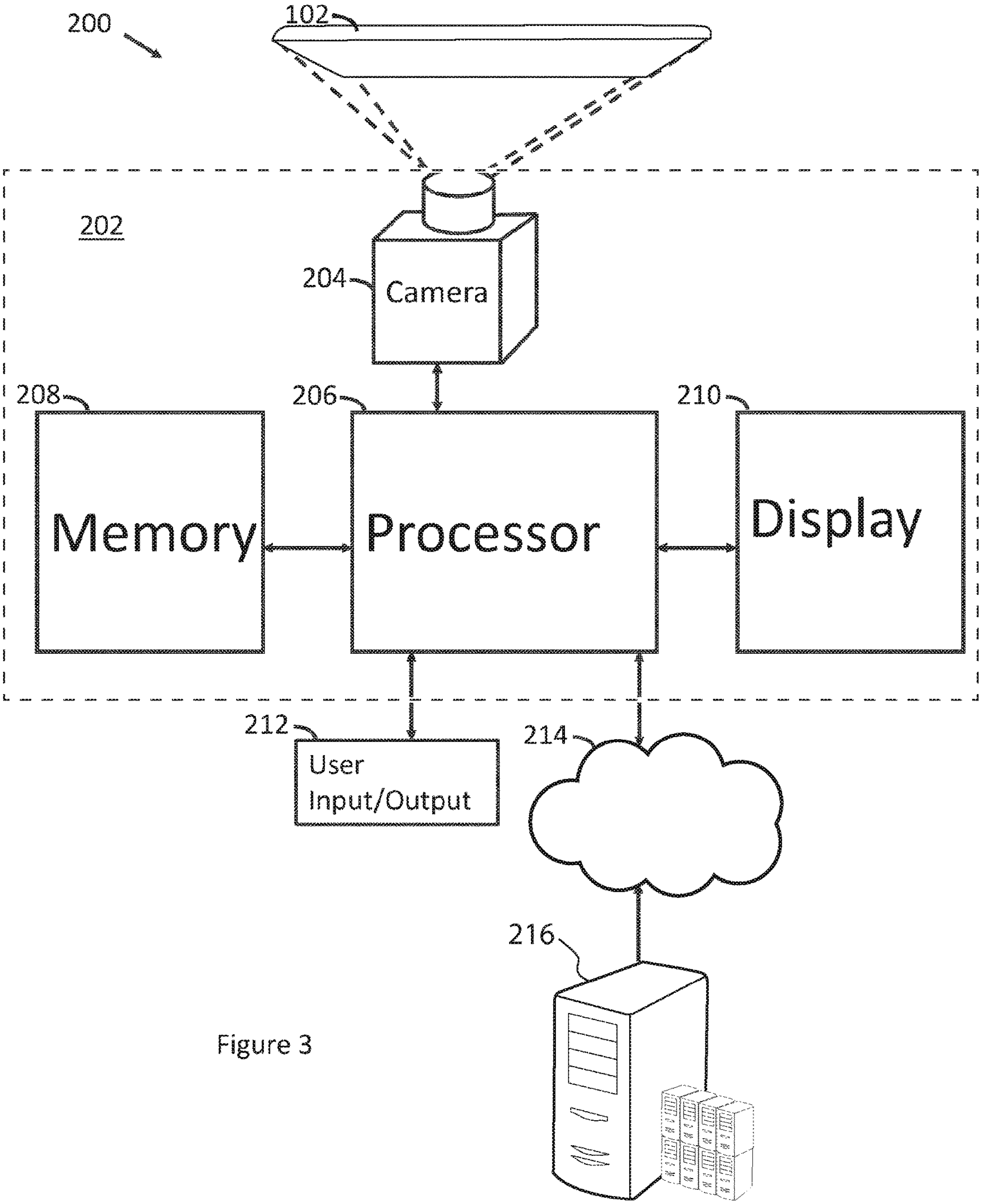
FIG. 3 shows an example block diagram of a smart device and associated system.

FIG. 3 shows an example non-limiting system 200 including a user device such as a smartphone 202, AR glasses, etc. which includes a camera or CMOS sensor 204, a processor 206, a memory 208, a display 210 and user input/output devices 212 such as a touch screen, push buttons, etc. The processor 206 communicates wirelessly or through a wire via a network 214 with a server 216 which may store the database 20 and in some embodiments perform the image recognition. The app may comprise executable instructions that the device 202 downloads from the server 216, stores in memory 206, and executes in response to user selection of input/output devices 212.

Figure 4:
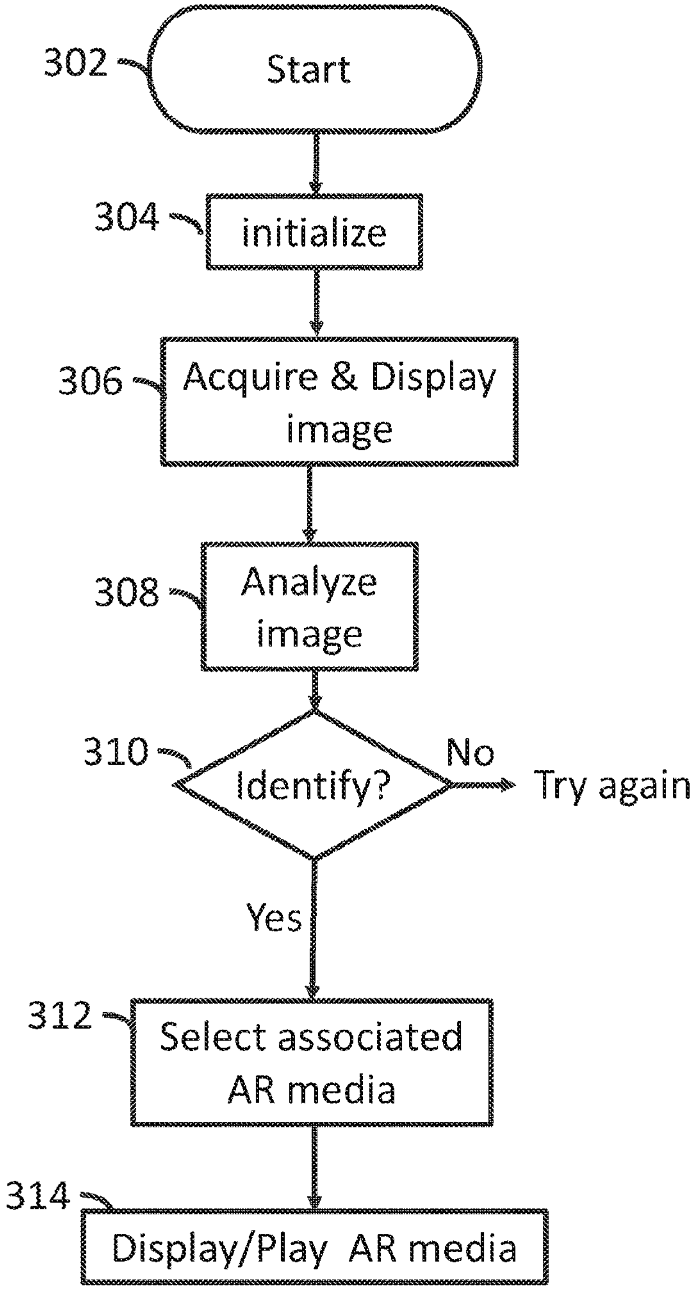
FIG. 4 shows an example non-limiting process flow diagram.

From a user perspective, as shown in FIG. 1A, after downloading an app onto their smart phone, smart glasses or other portable or non-portable device 202, the customer can point the device's camera onto a print, physical object or a digital copy on the screen of his tablet, computer, etc. (100; FIG. 4 blocks 302, 304, 306). This can be the camera of a device like an iPhone®, a cars/vehicles camera or an external camera or a camera that is a part of AR glasses. This causes the device 202 to display a photographically captured image on display 210 (see FIGS. 5A, 6A). It is possible in some embodiments for device 202 to obtain this captured image some other way than photographing an actual object 102, such as via network 214, e.g., by downloading the image through Instagram or other photo sharing service, by receiving the image via a text (SMS) message, by receiving the image from another device in proximity (e.g., using Bluetooth pairing, etc.) or by other means.

Once the app has been activated to recognize the captured image, the app connects with the database 20 on server 216 via network 214 and checks if this print is recognized (FIG. 4 blocks 308, 310). If recognition is successful (branch 110), an action is enabled (e.g., playing a video, telling a story and/or showing a picture, showing shoplinks or other information) (FIG. 4, blocks 312, 314). If recognition is unsuccessful (branch to 120), no action is enabled or a different action ("xyz") may be performed instead.

Virtual Image Anchoring

In one non-limiting example, the app causes the smartphone or other device 202 to show a picture or video by anchoring it to the image currently being captured by the device's camera 204 and displayed on the device's display 210. See FIGS. 5B, 6B. If the user moves the device slightly to change the position or orientation of the printed item on the device's's display 210, the picture or video will move with the image of the printed item on the display as if it were glued or otherwise adhered to the printed item or were being displayed by the printed item itself from a magic display window on the printed item. For example, the superimposed image can change position, orientation and/or perspective as the underlying real world object changes position, orientation and/or viewing angle in order to provide a photorealistic image in which the superimposed image appear to be part of the underlying real world image. See for example FIG. 6B. This augmented reality feature provides a sense of wonder or surprise that is designed to capture the attention of the user. Instead of appearing to be a "flat" advertisement, the picture or window appears to be much more interactive and interesting and thus captures the user's attention. The augmented reality image can be animated and can be accompanied by audio and/or tactile sensations as indicated in FIGS. 5A, 5B, 6A, 6B.

Mixed Reality and/or Virtual Reality

In other embodiments, so-called "mixed reality" or "virtual reality" can be used instead of or in addition to augmented reality. Generally speaking, "virtual reality" presents the user with an image of an entirely virtual/non-real world. The posture (orientation and/or position) of the device may be sensed (e.g., using inertial sensors such as accelerometers and/or gyrosensors; magnetic position and/or orientation sensors; RF beacon sensors; optical sensors providing an optical "flow" image analysis; and other known conventional technologies. Different portions of the virtual world may be displayed based on such sensed posture.

Other embodiments can use so-called "mixed reality" (MR) that mixes virtual and real scenes. Such an MR experience is one where the user is placed in an interactive setting that is either real with virtual asset augmentation (augmented reality), or virtual with real-world augmentation. See Ohta et al, Mixed Reality: Merging Real and Virtual Worlds (Springer Publishing 2014); Milgram et al, A Taxonomy of Mixed Reality Visual Displays, IEICE TRANSACTIONS on Information and Systems Vol. E77-D No. 12 pp. 1321-1329 (Dec. 25, 1994); Hughes et al, Mixed reality in education, entertainment, and training, IEEE Computer Graphics and Applications (Volume: 25, Issue: 6, November-December 2005).

Further Use Cases—Two Dimensional Printed Objects

In more detail, a user can aim the camera of a smartphone, smart glasses or other electronic device at any two-dimensional or three-dimensional real world object or a likeness of such an object. One example type of a two-dimensional object could be a portable, wallet-sized planar object such as a banknote, driver's license, passport, printed advertisement, real estate advertisement or other official or unofficial identification document examples of which are shown in FIG. 2A-2I. Other examples of such objects might include for example a real estate advertisement, a human resources want ad, and objects related to a shopping experience. Using the technology with AR Glasses instead of a mobile phone means, that you do not touch a button of the superimposed digital image on your screen but press either a virtual button to shop or get information or just say that you want to press a specific button or say that you want to see a video or say that you want to buy a merchandise that is offered within the digital overlay, Real Estate Printed Object For example, the object as shown in FIG. 7 may comprise a real estate advertisement which can show one or several houses, lots, commercial buildings, private properties etc. An example area of recognition may constitute a single advertisement or a portion of an advertisement (see FIG. 8). Image recognition may be used to recognize the particular real estate property, and such recognition may be used to select and initiate display of a media item that provides more images and information concerning that property.

These information can be floor plans, videos of the property, contact data of the agent, the lot size, drone videos, the actual price tag or any other information that are relevant for the seller, the buyer or the agent.

Shopping or Travel Advertisement Printed Objects

The same with any shopping or travel advertisements where you define an area of recognition which could be a part or parts of that advertisement or even the full page to trigger a superimposed image that contains videos, shoplinks or other buttons that provide other content or information and allow to buy merchandise, travel related services (flight, hotel, tour, cruise, travel package, insurance and/or watch, read related information.

Packing Printed Objects

Another example for a use case is related to packaging, where you define an area of recognition or several on a 3 dimensional object. After a match in the database you can add product information, videos, or any other content or buy the specific merchandise.

Employment Advertising Printed Objects

As another example, the object shown in FIG. 9 is an employment advertisement. Image recognition processes may be used to recognize the advertisement. Successful recognition can be used to select and cause display of a media item that provides more information and images concerning the employment opportunity. For example, there is a strong use case where you point the camera on a standard HR advertisement and then you see, for example, the CEO or the HR Manager of the company describing that specific job.

Facial Recognition

As yet another example, the object may comprise the face, head or body of a person or animal. Image recognition processes may be used to recognize the person or animal. Successful recognition can be used to select and cause display of a media item that provides more information and images concerning the recognized person or animal.

Shopping Item Printed Object

Yet another example uses an object comprising a shopping item such as a particular product or service offering. Image recognition processes may be used to recognize the product or service offering. Successful recognition can be used to select and cause display of a media item that provides more information and images concerning the recognized product or service offering, or buying options In one example, such objects may be made of paper, plastic and/or other materials, and may be rigid, flexible and/or foldable. They may be of standard sizes such as 2.61 inches wide and 6.14 inches long; 120 by 62 millimeters (4.7 in×2.4 in) to 160 by 82 millimeters (6.3 in×3.2 in); the ID-1 format size of 85.60×53.98 mm (3⅜ in×2⅛ in approx.) and rounded corners with a radius of 2.88-3.48 mm (about ⅛ in); ID-3 standard size of 125×88 mm (4.921×3.465 in); or other size. See for example ISO/IEC 7810:2003. The object may be two-dimensional or three-dimensional.

Banknote Printed Objects

One example such object comprises a banknote such as a US dollar bill, US five dollar bill, US ten dollar bill, US twenty dollar bill (see FIG. 2A), US fifty dollar bill (see FIG. 2B), a US one-hundred dollar bill (see FIG. 2C), a 20 euro note (see FIG. 2D), a 50 euro note (see FIG. 2E), or any other currency banknote. Other example objects comprise official government-issued identification such as a government issued passport (see FIG. 2F), passport card (see FIG. 2G), driver's license (see FIGS. 2H, 2I), coin (FIG. 2J) or other official or unofficial object.

Such two-dimensional objects as described above often are protected by any or all of the following visible security features:

- holograms such as portrait window(s)
- woven three-dimensional security ribbon(s)
- distinctive image pattern(s) such as the EURion constellation
- glossy stripe(s) that reveal additional information when viewed on an angle
- watermark(s)
- raised printing
- ultraviolet ink (which reveals additional image information when viewed under ultraviolet light)
- thermochromatic ink (the color of which is dependent on temperature)
- color changing or color shifting ink (the color changes depending on viewing angle)
- see through indicia with complementary front and obverse portions
- microprinting (high resolution printing)
- unique printing fonts
- embedded security threads
- perforations
- plastic, cotton fiber or other material matted or other textured surface(s)
- barcodes
- serial numbers
- foil stamps
- photographs including clear window photographs
- unique metal compositions (for coins) such as bi-coloration
- other.

Example non-limiting recognition processes as described above can exclude such security features, or may take them into account or use them as part of the recognition process. However, since the purpose of the recognition is not to authenticate the photographed item as being genuine, the recognition/matching algorithm is quite different from ones that are used for banknote or ID authentication. In example non-limiting embodiments for example, it is desirable that matching occurs based on photographing a copy (e.g., displayed on a tablet screen or the like) and not just an original of a banknote, ID or the like. Thus, the matching will achieve positive results based on counterfeit (inauthentic) banknotes or IDs. However, the matching/recognition is robust in being able to detect different banknote denominations (e.g., 10 euro note versus 20 euro note versus $100 US bill etc.) and thus provide different overlays depending on which banknote is recognized.

Example Non-Limiting Image Recognition

Figure 4A:
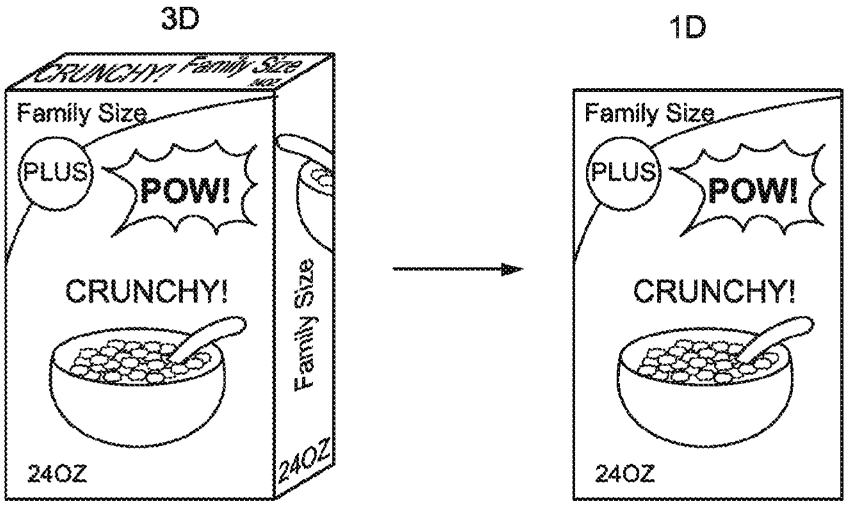
FIG. 4A shows recognition of 2D and 3D objects.

The image recognition performed by example embodiments is different from prior techniques of recognizing a QR code/other AR technologies. For example, illustrative image recognition technology herein transfers any 1-dimensional, 2-dimensional or 3-dimensional object into a one-dimensional representation. That means that we can but do not need to recognize any shape or form of a 1, 2 or 3 dimensional object. See FIG. 4A. Typically, 2D or 3D scanners are not able to process 1D. With this technology, all objects are technically translated into a common representation so a 3 D package of a product is transformed before it is compared with assets stored in the data base to play out a digital overlay.

Figure 4B:
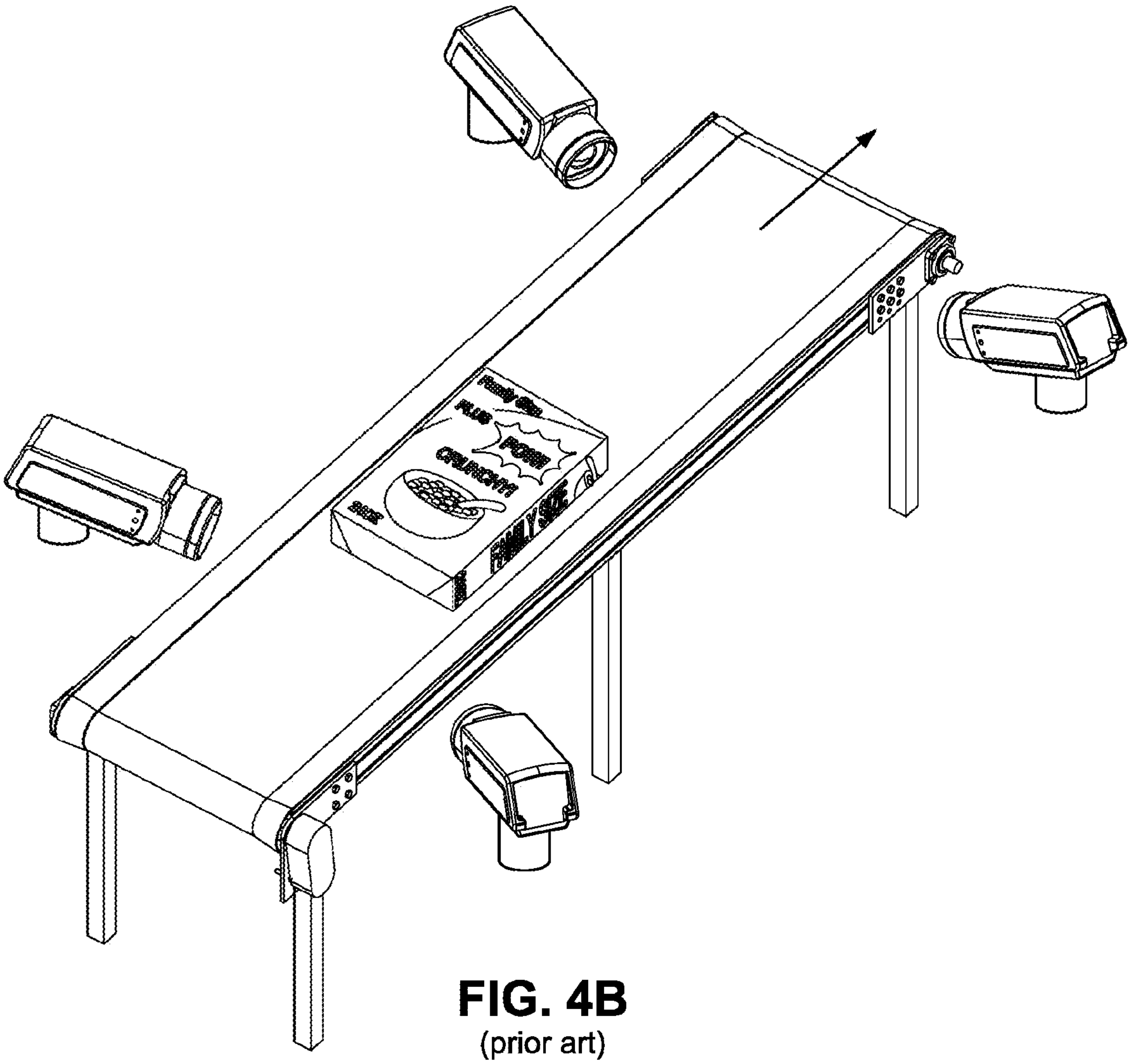
FIG. 4B (prior art)
FIG. 4B shows a prior art recognition approach

With example non-limiting embodiments, there is no need for a controlled environment to scan objects successfully. The embodiments do not need a controlled environment, like on a conveyor belt, to work successfully. See FIG. 4B. Nor are several permanently installed camera systems needed, neither do we need a belt that has a determined path for the objects that have to be scanned to travel. The mentioned technology reliably detects the object when photographed from different angles, such as the camera of an iPhone® or the camera of special glasses (which are in contrast flexible). Such cameras have increasingly high resolution but because they are typically handheld and are not standardized, the field of view and perspective vary from device to device and user to user. The lighting, image quality, magnification and amount and characteristics of parallax distortion typically varies from photo to photo. Furthermore, the resulting captured images are also typically subjected to different types of image compression. The systems camera used by embodiments herein does not need a special position, altitude, perspective etc. It is very flexible in contrast to other systems.

Figure 4C:
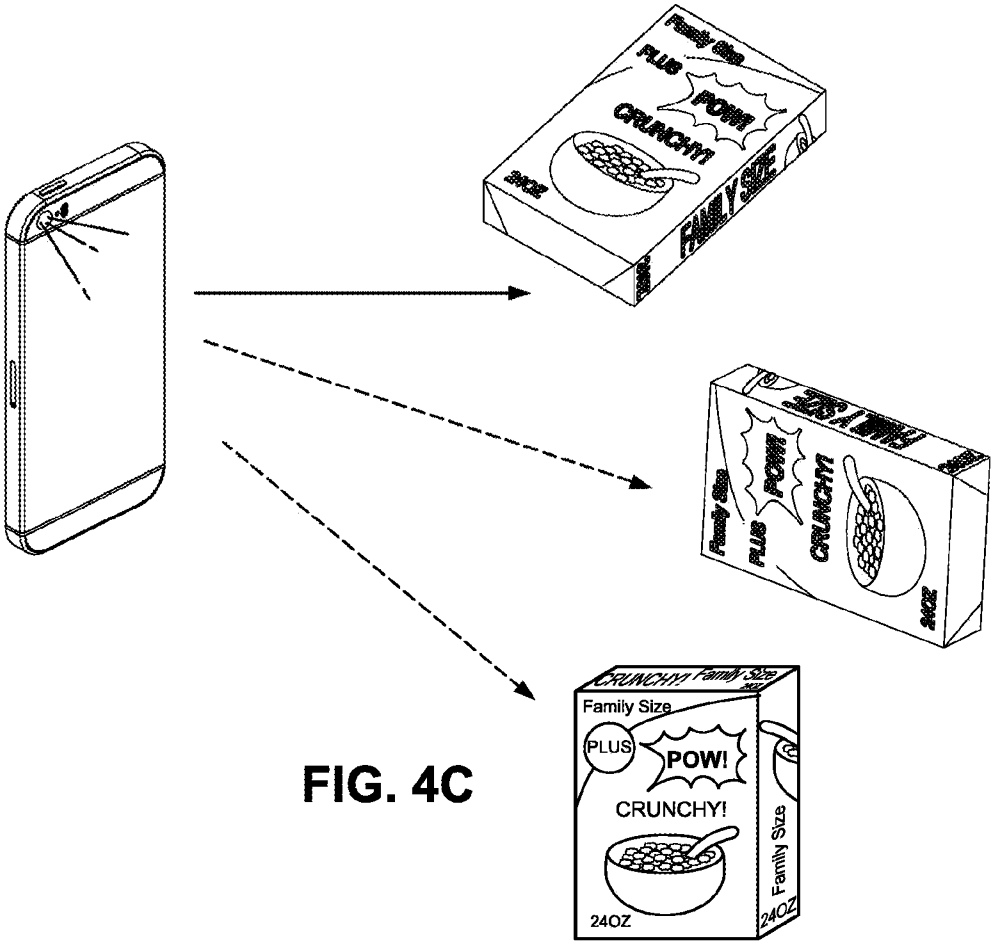
FIG. 4C shows a smart phone using limited light intensity for reliable image capture.
Figure 4D:
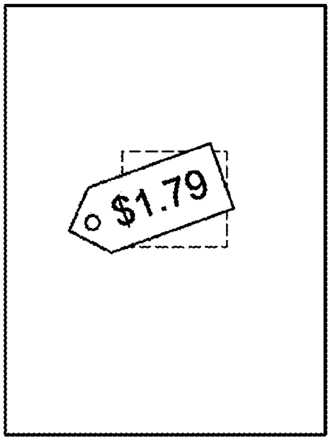
FIG. 4D (prior art)
FIG. 4D shows a prior art approach with a restricted area of recognition resulting in no image capture.
Figure 4E:
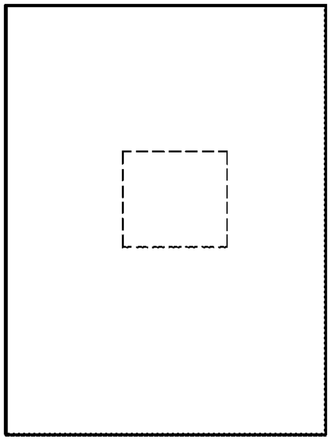
FIG. 4E (prior art)
FIG. 4E shows a prior art approach with an obscured area of recognition resulting in no image capture.
Figure 4F:
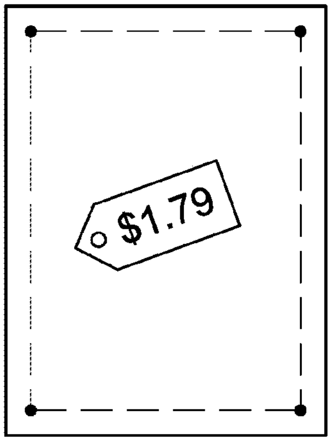
FIG. 4F shows a flexible area of recognition.

The mentioned system, because it works with shades of grey and colours, does not need the object in good light. A mobile phones camera is sufficient to have a successful scan, even in a darker environment. The light from the mobile phone itself is typically sufficient to capture a useful image. See FIG. 4C.

Any type of 2D or 3D object can be the subject of image capture and analysis. In still other embodiments, the two-dimensional or three-dimensional object could comprise a political campaign poster, billboard, flyer package, floor stand, table stand, pen with advertisement or other printed material or 3 dimensional object with print and the overlay could provide a campaign song, slogan, speech, story, video or other content. Other types of campaigns could include advertising campaigns, company logos and printed advertising or any other printed campaign from companies or other entities.

As discussed above, other embodiments can employ a two-dimensional object comprising a real estate advertisement, a job advertisement, a product advertisement, a service advertisement, or any other presentation of an item, entity or organization that a user may wish to obtain more information concerning.

In example embodiments herein, the two-dimensional object is not (and does not need to contain) a so-called "AR marker" or 2D bar code and is otherwise not specially designed or intended to be recognized by an augmented reality display device.

The technology herein also is able to flexibly define areas of recognition.

Example 1

Figure 5A:
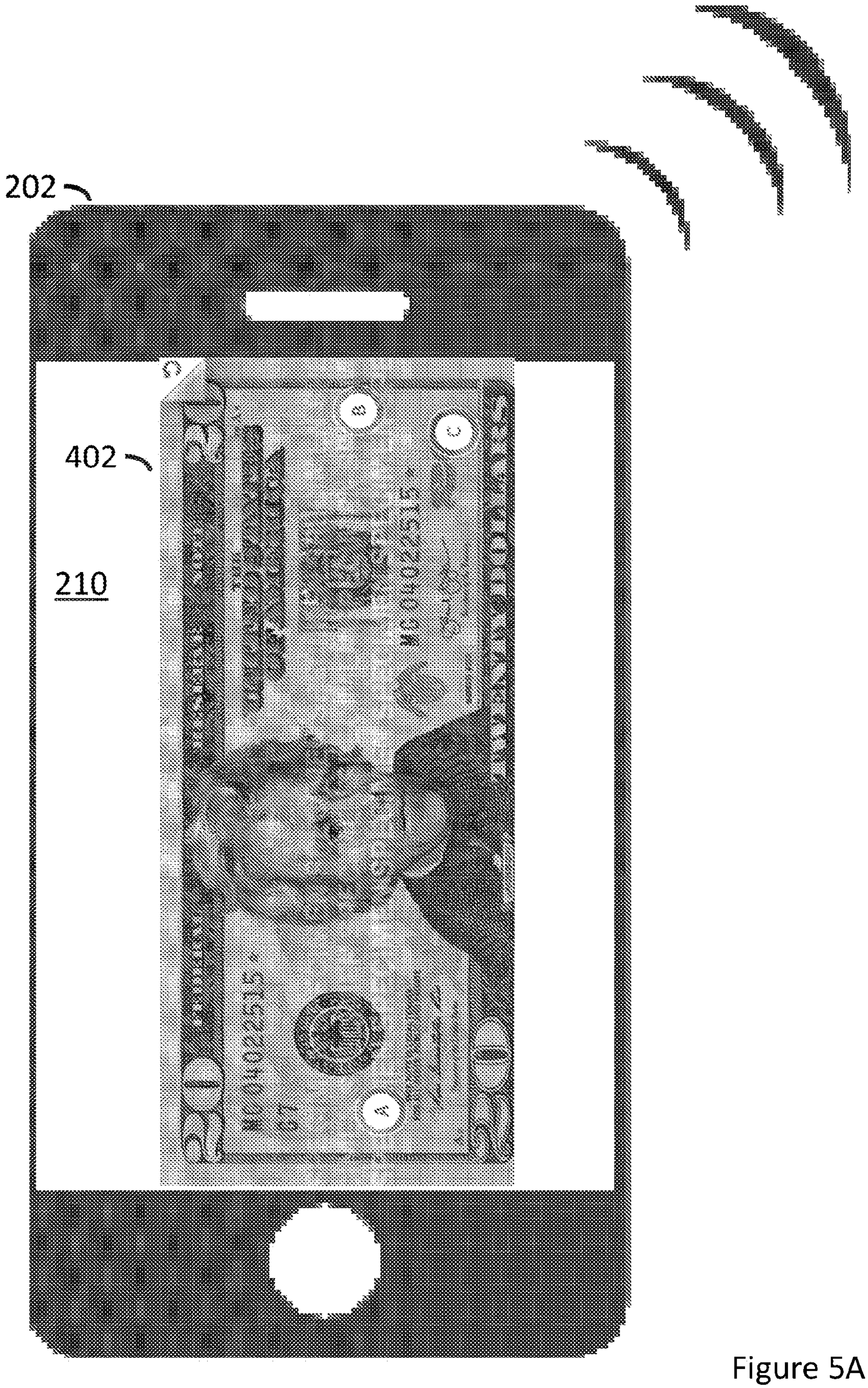
FIGS. 5A and 5B show an example augmented reality image superimposing a virtual image onto image captures.
Figure 5B:
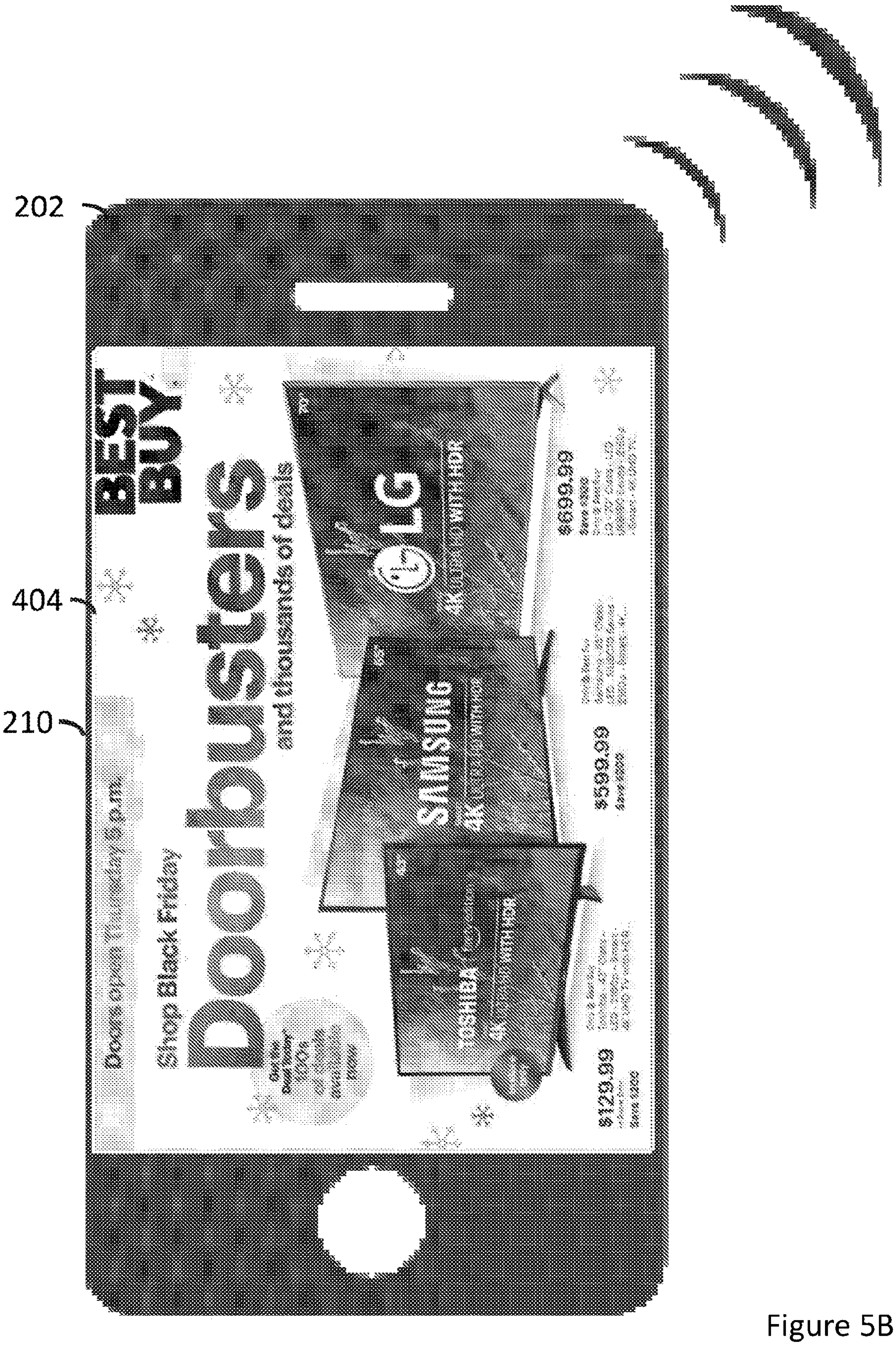

FIG. 5A shows a smart device 202 the camera of which has captured an image of a $20 bill. Once the app recognizes the captured image 402 as described above, it displays a corresponding advertisement 404 as shown in FIG. 5B. The advertisement may be superimposed over the captured image 402.

Example 2

Figure 6A:
FIGS. 6A and 6B show an example augmented reality image superimposing a virtual image (a video) onto an image capture of the front cover of a US passport.
Figure 6B:

FIG. 6A shows a smart device 202 the camera of which has captured an image of a US passport. Once the app recognizes the captured image 406 as described above, it displays a corresponding video 408 (as shown in FIG. 6B) that is superimposed onto the captured image 406. If the user rotates the smart device 202 to change the position and/or orientation of the captured image 406, the corresponding video 408 will also change its position and/or orientation by the same amount. In some embodiments, the video 408 may be displayed with controls such as play/stop, fast-forward, rewind and mute that the user can press on the touch screen display 210 to allow the user to control playback of the video and/or accompanying audio.

Example 3

Instead of a video, FIG. 6B could display a superimposed control bar that allows the user to play an audio story associated with the captured image 406.

Example 4

Figure 7A:
FIG. 7A shows an example capture of an image of a print advertisement on a smart device.
Figure 7B:
FIG. 7B shows an example area of recognition of the FIG. 7A image capture.
Figure 7C:
FIG. 7C shows an example augmented reality image including superimposed virtual images (e.g., virtual shopping carts) onto the FIG. 7B image capture.

FIG. 7A shows a captured image of a print advertisement. FIG. 7B shows an example area of recognition. FIG. 7C shows a superimposed virtual image (shopping carts) on the FIG. 7A captured image to provide a virtual or mixed reality composite image.

Example 5

Figure 8A:
FIG. 8A shows an example image capture of a print advertisement.
Figure 9A:
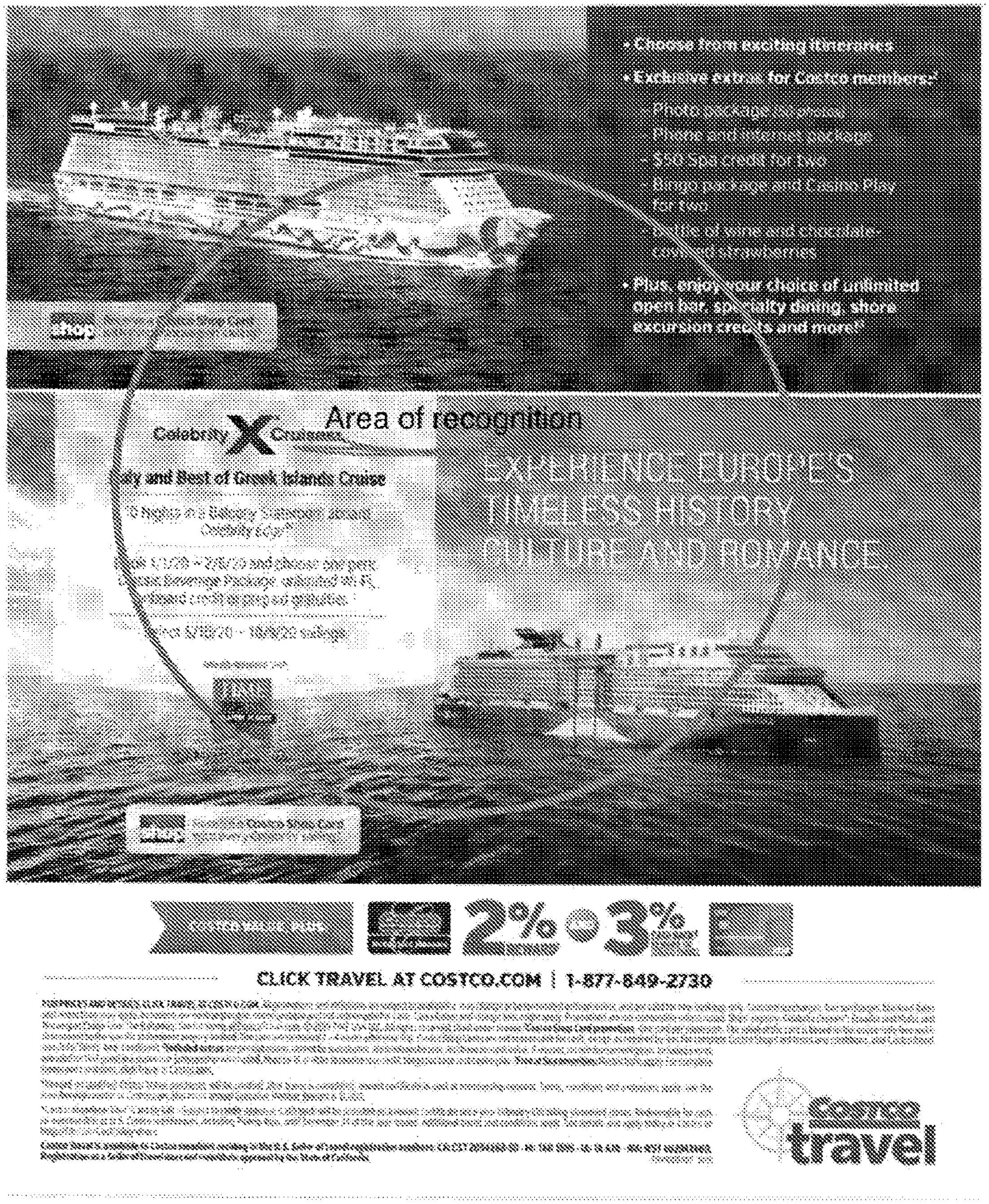
FIG. 9A shows an example area of recognition of the FIG. 8A image capture.
Figure 9B:
FIG. 9B shows an example augmented reality image superimposing virtual images (virtual shopping carts) onto the FIG. 8A image capture.

FIG. 8A shows an example of a captured image of a print advertisement. FIG. 9A shows an example area of recognition. FIG. 9B shows a superimposed virtual image (a shopping cart) on the FIG. 8A captured image to provide a virtual or mixed reality composite image.

Example 6

Figure 10A:
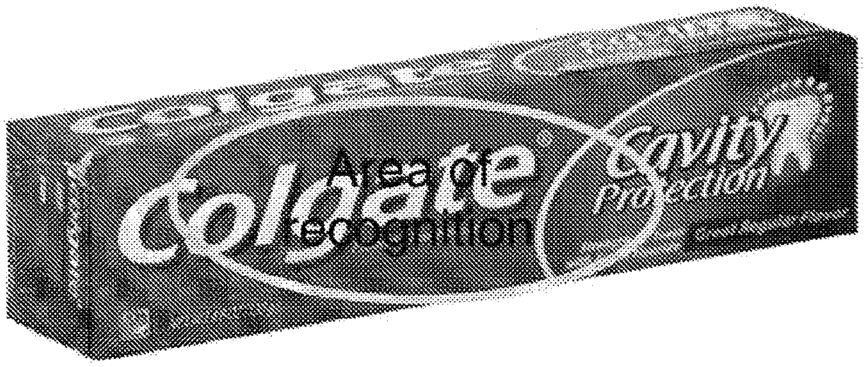
FIG. 10A shows an example image capture of a product trade dress including an area of recognition.
Figure 10B:
FIG. 10B shows an example augmented reality image superimposing a virtual image (e.g., a video of ingredients) onto the image capture of the FIG. 10A product trade dress.

FIG. 10A shows a captured image of a product package with a defined area of recognition. FIG. 10B shows a superimposed virtual or mixed reality composite image providing a video of ingredients.

Example 7

Figure 11A:
FIG. 11A shows an example image capture of a real estate print advertisement including an area of recognition.
Figure 11B:
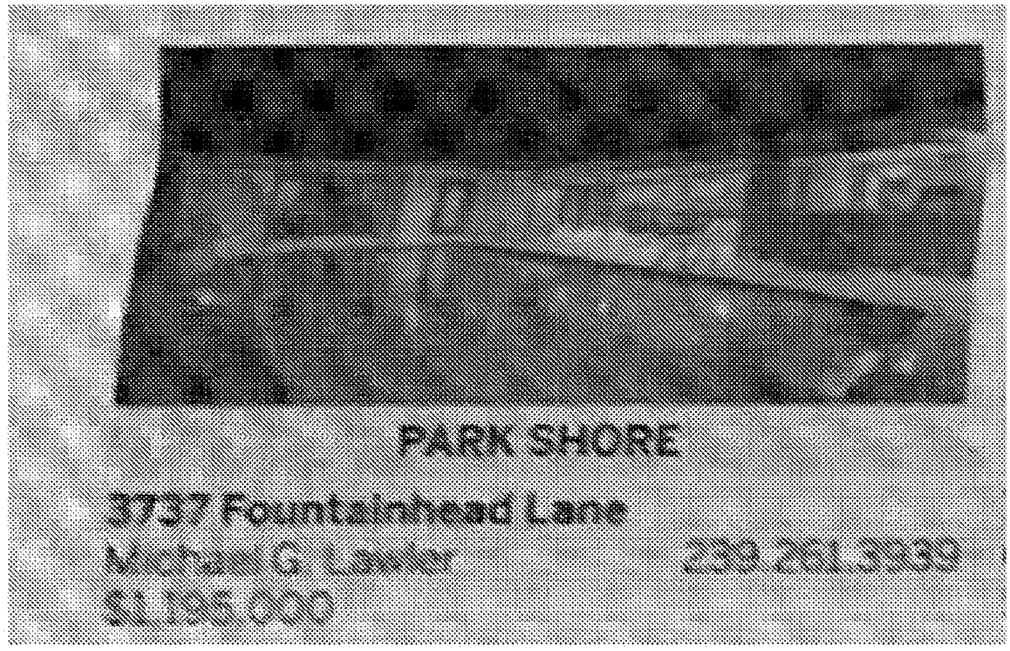
FIG. 11B shows a closeup view of the FIG. 11A area of recognition.
Figure 11C:
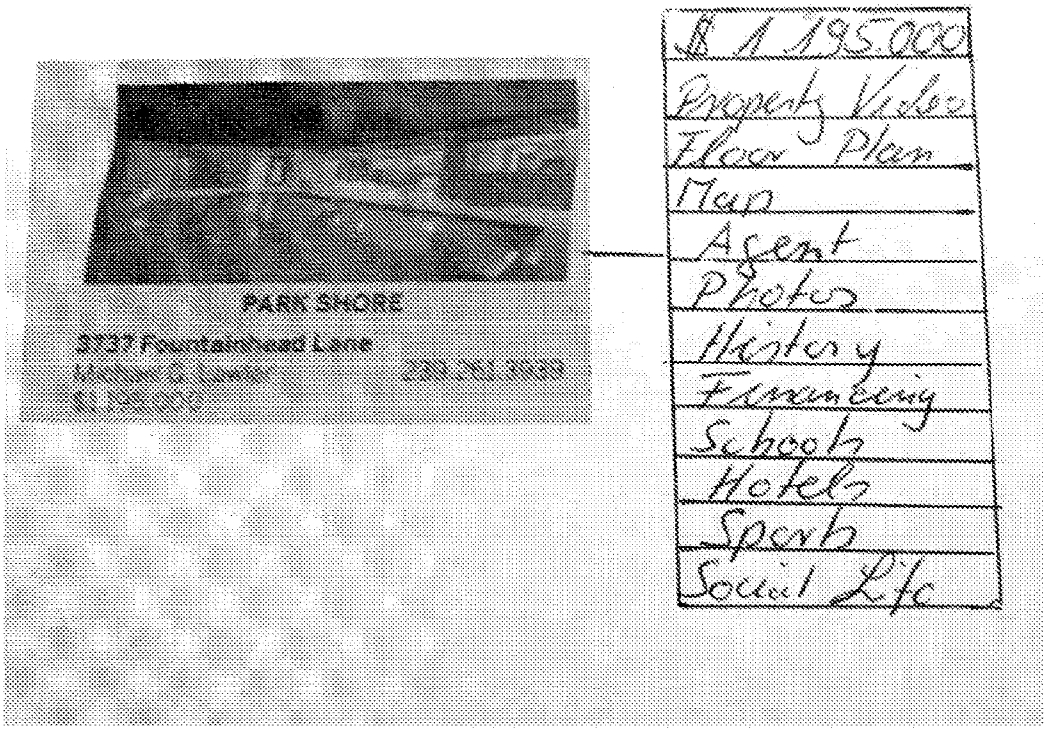
FIG. 11C shows an example augmented reality image superimposing a virtual image (e.g., a listing of additional information concerning the property) onto the image capture of FIG. 11A.

FIG. 11A shows a captured image of a print advertisement for real estate listings. FIG. 11B shows a closeup of an area of recognition. FIG. 11C shows a superimposed virtual image on the FIG. 11B captured image.

FIG. 12 shows an example captured image of a human resources advertisement. This captured image can have an area of recognition and can have a digital image superimposed thereon to provide an augmented or mixed reality image on a smart device such as a smartphone, smart glasses, etc. In some embodiments, the display process may comprise projecting the digital overlay directly or indirectly onto a user's retina. Such techniques would allow the user to view the digital overlay on a screen (e.g., smartphone) and/or on glasses that are used as a screen and/or independently of any screen viewing (i.e., the user could simply view the real world and the digital overlay would become part of their field of view based on such projection directly onto their retina).

Flyer Example

Figure 13A:
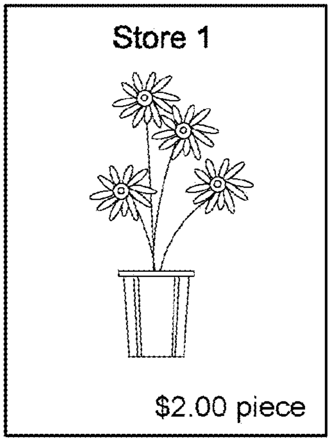
FIG. 13A (prior art)
FIGS. 13A, 13B show prior art flyers.
Figure 13B:
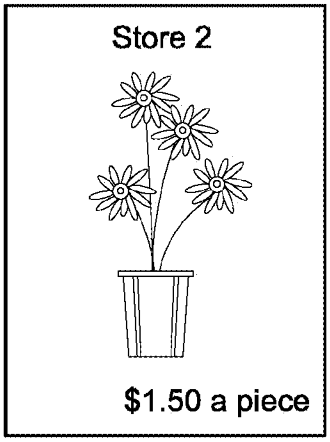
FIG. 13B (prior art)

Take a 10 page advertisement for a Hardware store like The Home Depot, Lowes etc. that is distributed in a printed version to attract customers. See FIGS. 13A, 13B. The merchandise you show has a certain price tag and description that has to be defined weeks or days before the print happens. After it is printed, you can barely react to any changes in pricing that might be triggered by an aggressive competitor that offers the same merchandise for the same price or lower.

Figure 13C:
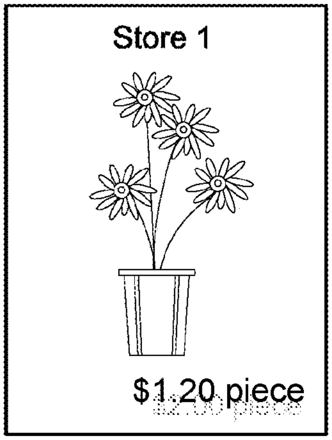
FIG. 13C shows an example flyer with a digital overlay.
Figure 13D:
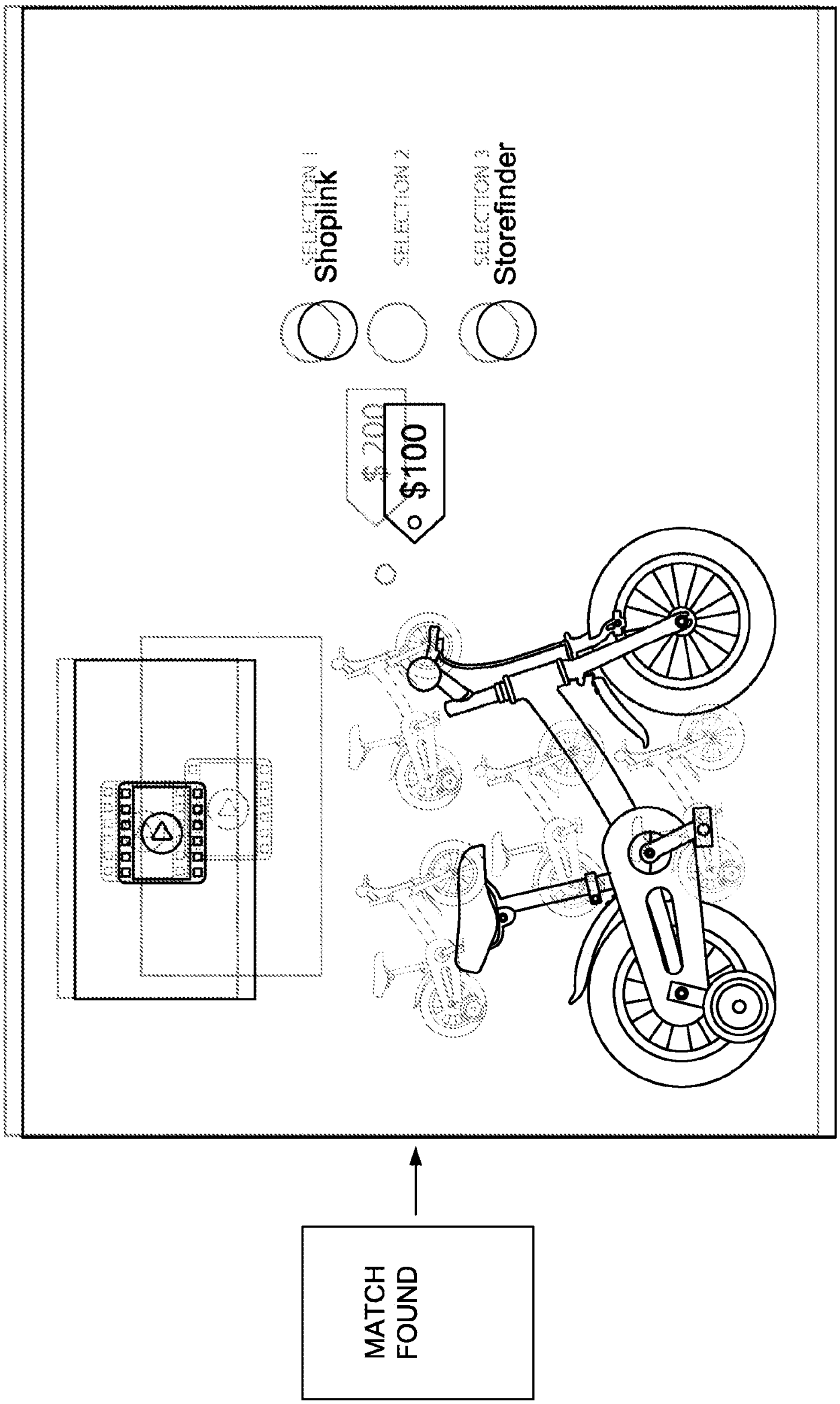
FIG. 13D shows an example recognition, matching and overlay process.

In contrast, with a system disclosed herein, you scan the printed flyer which does not include a price (FIG. 13C), match the image with the data base and play a specific digital overlay that is customized to this special page. See FIG. 13D. In this example, after finding a match in the database, the system plays out an associated interactive, video, or other digital overlay. Since we work with a digital overlay, even a printed price tag is a print or printed flyer can be superimposed with a new price tag. The overlay can include for example an interactive video and/or a shop button and/or a price and/or a store finder where the particular product is in stock. To change a price tag, you just need to change the price tag of the digital overlay. This digital overlay is sent back to the originating user device and is displayed in a superimposed fashion "on top of an image capture of the original print advertisement. Content of the overlay such as video, price, merchandise description, etc. can be changed, customized or updated instantly without changing the printed advertisement. For example, different geographical regions can show different prices or other content depending on demographics, availability, supply and demand, etc.

Let's assume the demand is very high and this merchandise is out of stock in STORE A but still available in STORE B. In this case you add an information to the digital overlay directing customers to STORE B to buy this merchandise.

If this would happen to a system that works with a different technology like a QR code or a hidden printed signature, you would have to reprint the flyer and distribute it again.

Another example is a real estate advertisement.

With a QR code or a hidden printed signature it would not be possible to update the content in seconds. While by using the technology mentioned herein allows to just change some information within the digital overlay. There is no need to reprint the real estate advertisement to change a QR code or change a hidden printed signature.

Automobile Example

In another embodiment, you sit in a car that has cameras and the information is displayed on the cars windows so that the passengers can see the digital information. 3D objects can only be recognized if they have any kind of print on their surface so that the system can recognize a color or grey code. Only the shape of an object is not enough as a trigger. That means that you can detect any 3 dimensional object if it has at least a bit of print on its surface that allows to define an area of recognition.

Further Working Example

Figure 14:
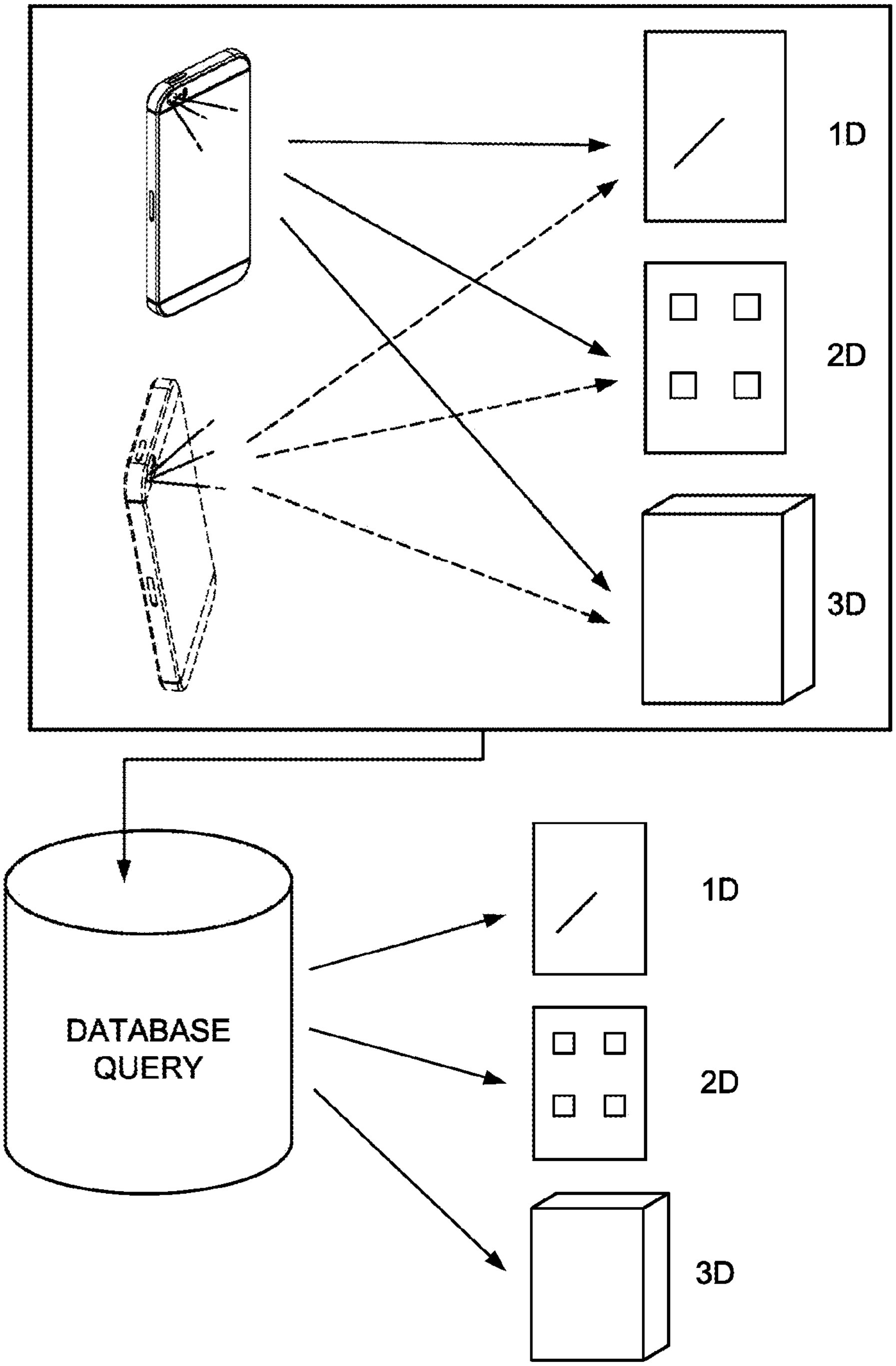
FIG. 14 shows an example system embodiment.

As shown in FIG. 14, the camera of a device recognizes an object 3D, which could be a package of a toothpaste. The camera can also detect a 2D page of a newspaper or a printed advertisement. This could be an advertisement presented as a leaflet or a flyer or a magazine, or a poster, a citylight or a picture, presenting just one article of merchandise, just one property or more merchandise or more properties.

The camera could also detect just a line printed on a white piece of paper, a circle or different separated lines on a piece of paper. These are 1D example sources.

In this embodiment, the camera position is not fixed. Object positioning is therefore flexible.

All these dimensions, from 1D to 3D are analyzed by the technology by their different shades of grey and/or their color code. This can occur on the capture device, in the cloud, or in any distributed fashion. The results of the analysis is compared with the content of a data base that includes the specific shades of grey/colors of different objects.

Figure 14A:
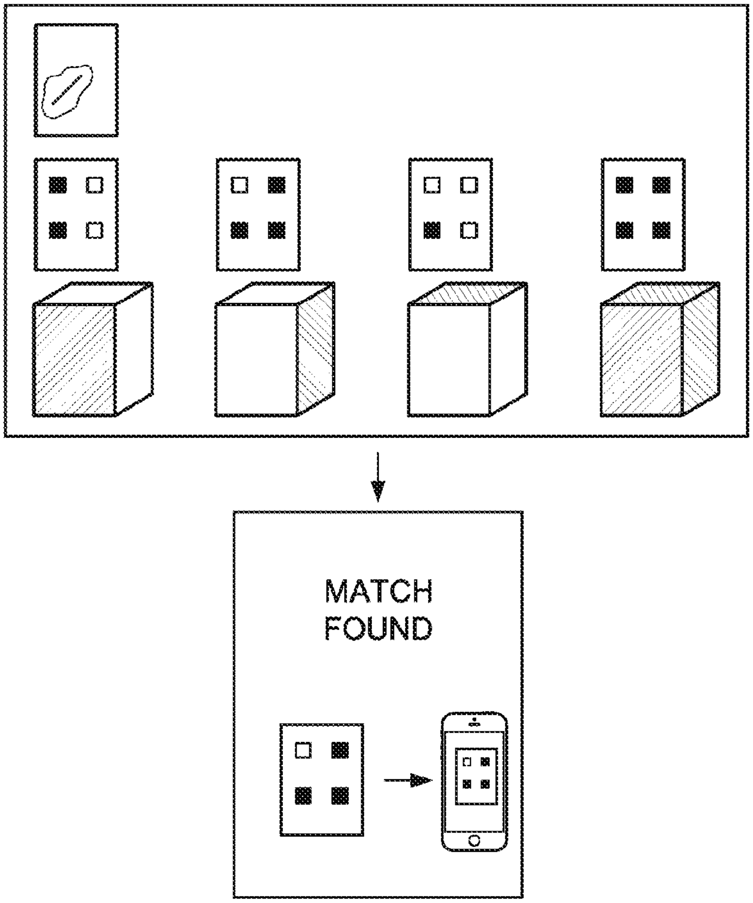
FIG. 14A shows example areas of recognition.

To identify a 1D, 2D or 3D object, and to avoid restricted areas to identify an object, you can define an area of recognition dedicated to that object. As shown in FIG. 14A, this area of recognition can be defined as the whole object, just a part of it or several different parts to avoid an mismatch or a non-match that would happen, if, as example, a restricted area of recognition would be covered by a price tag etc.

The combination of different areas of recognition allows the system to "find or identify" the object even if certain areas are covered or the object is scanned from a different perspective. That means that successfully scanning objects is not depending on a fixed camera angle or a fixed position on a conveyor belt or the appearance of a specific side of a 3D object to be identified.

Therefore you do not need hidden printed codes or a QR code.

Figure 15:
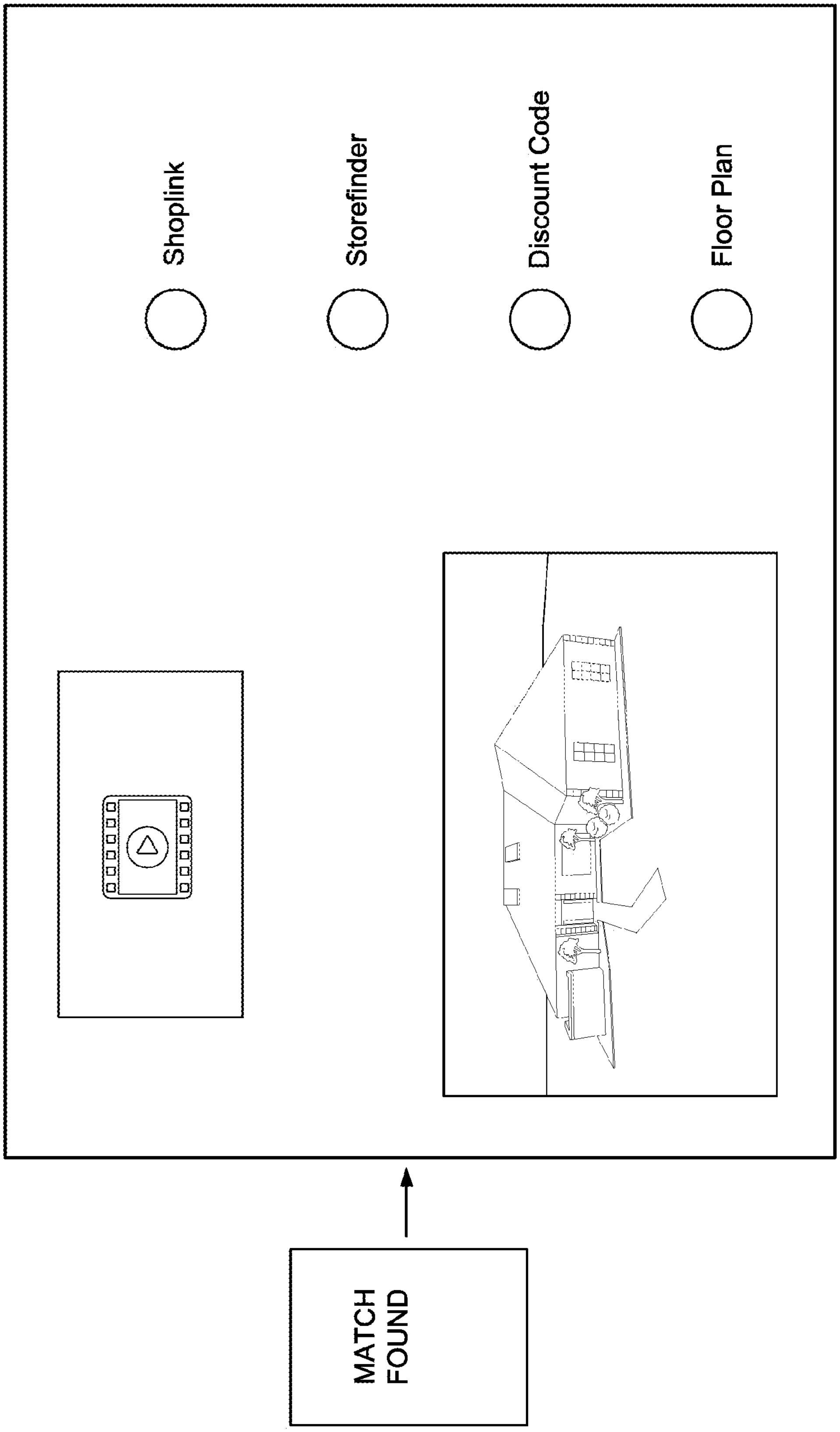
FIG. 15 shows an example digital overlay.

Each object in this data base is connected to a digital overlay that will be transmitted back to the device so that it will play out on a screen, lenses or a monitor. The digital overlay can cover 100% or more of the object or only one or more parts of the object. Within this digital overlay, videos can be played or buttons can be implemented. There can be several buttons with several different functions. See FIG. 15. These button can direct to a shop to buy instantly, can direct to information like a manual, a store finder, a call number etc. Depressing a button can automatically generate a call to a supplier. The call could be a telephone call, a digital voice or video call, or could cause a supplier to call the customer back.

Tracking Attention

Figure 16:
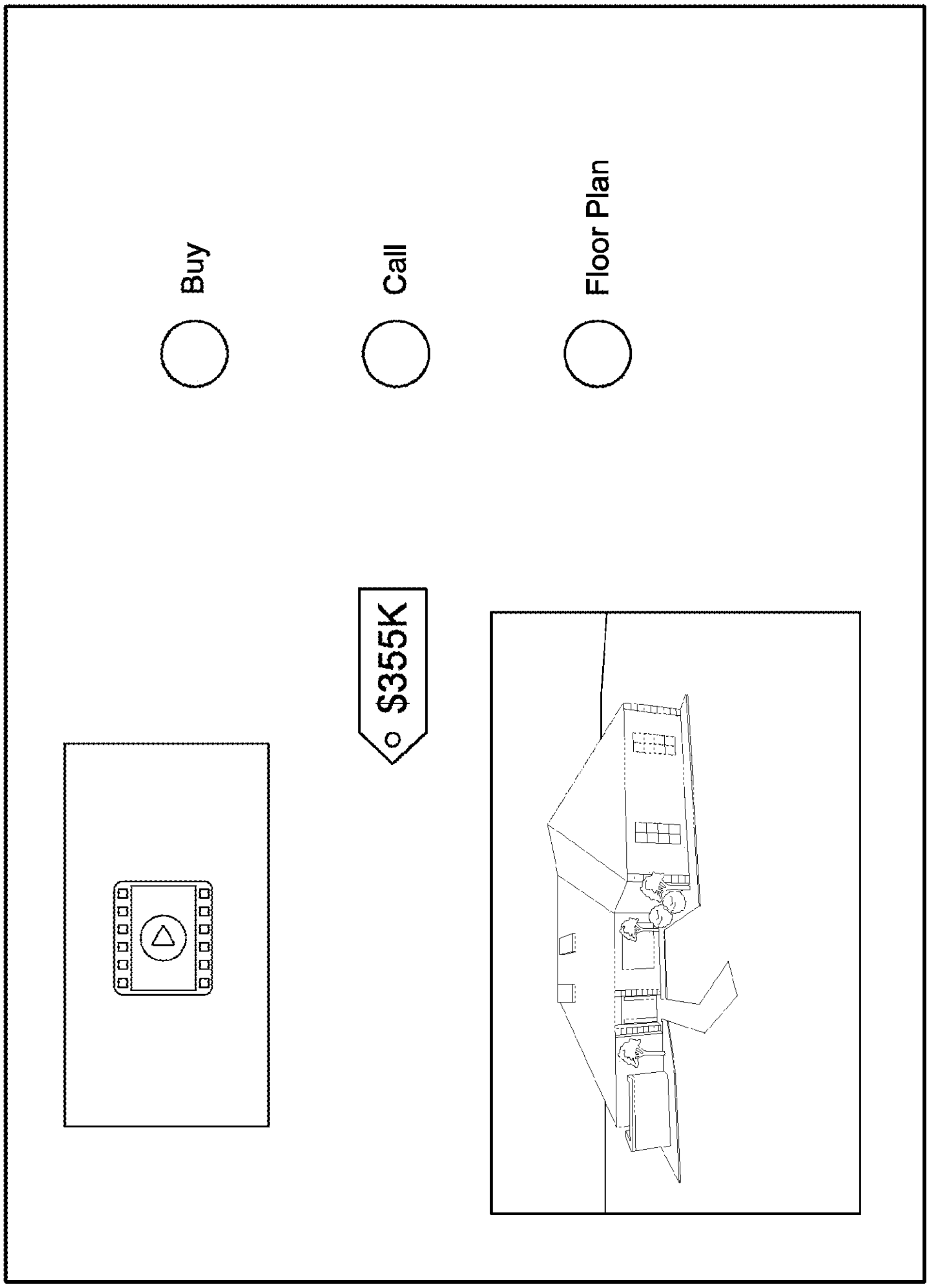
FIG. 16 shows example analytics.

This technology allows to count and measure all activities like detection, watching a video, shop, press a call button etc. For example, all actions triggered by the functions of the digital overlay are counted and measured to provide valuable analytics by statistics or artificial intelligence (AI). See FIG. 16. The system can measure the activity itself, the duration of watching a video, the order of activities (first a video, then shop), the shopping activity (when, where, how much, which price tag, using a discount or not) and the value of the related price tag. See FIG. 16. For example, the system can measure:

How many people watched a video, and how long did they watch

How many people watched the video and then purchased the product.

How many people bought the product without watching the video.

Based on such information collection, the system can provide data and recommendations—for example only 20% watched the video, so the video should be dropped; or 80% watched the video and bought the product, so the video should be retained.

In a real estate environment, the system can measure if customers pressed the floor-plan button first, or if they preferred to see the pricing history or the photos or the list of schools, first.

The aggregated data allow related analytics and finding certain patterns in complex data environments (AI).

Based on these analytics, the system can generate recommendations, too.

Length of a video, order of merchandise in a flyer to increase customer attraction, certain price levels that had a better response rate, different video content to increase the time a consumer watches etc.

Since the system can measure any activity within this digital overlay, it can also detect when customers stop doing something and learn from that.

One example is a video that is too long or is regarded as boring.

Without related analytics there would be no recommendation based on data, how long a video should be to be watched by more people, or which content entertains better.

Same with different price levels that provide more or less shopping activity.

That means that the system not only detects and plays out related content and options in a digital overlay, it also measures, counts and analyzes with statistics and algorithms that could be AI, what the user is doing to generate reports, statistics and recommendations to optimize as example pricing.

Apart from the total flexibility of viewpoint and its ability to use color and shades of gray it can do 1D, 2D and 3D.

We do not need a restricted area of recognition and that it provides data generated from users engaging with the functions and services that are embedded in that digital overlay.

The overlay can be bigger that the object itself, cover 100% or just a fraction of the object.

Many Example Use Cases

Figure 17:
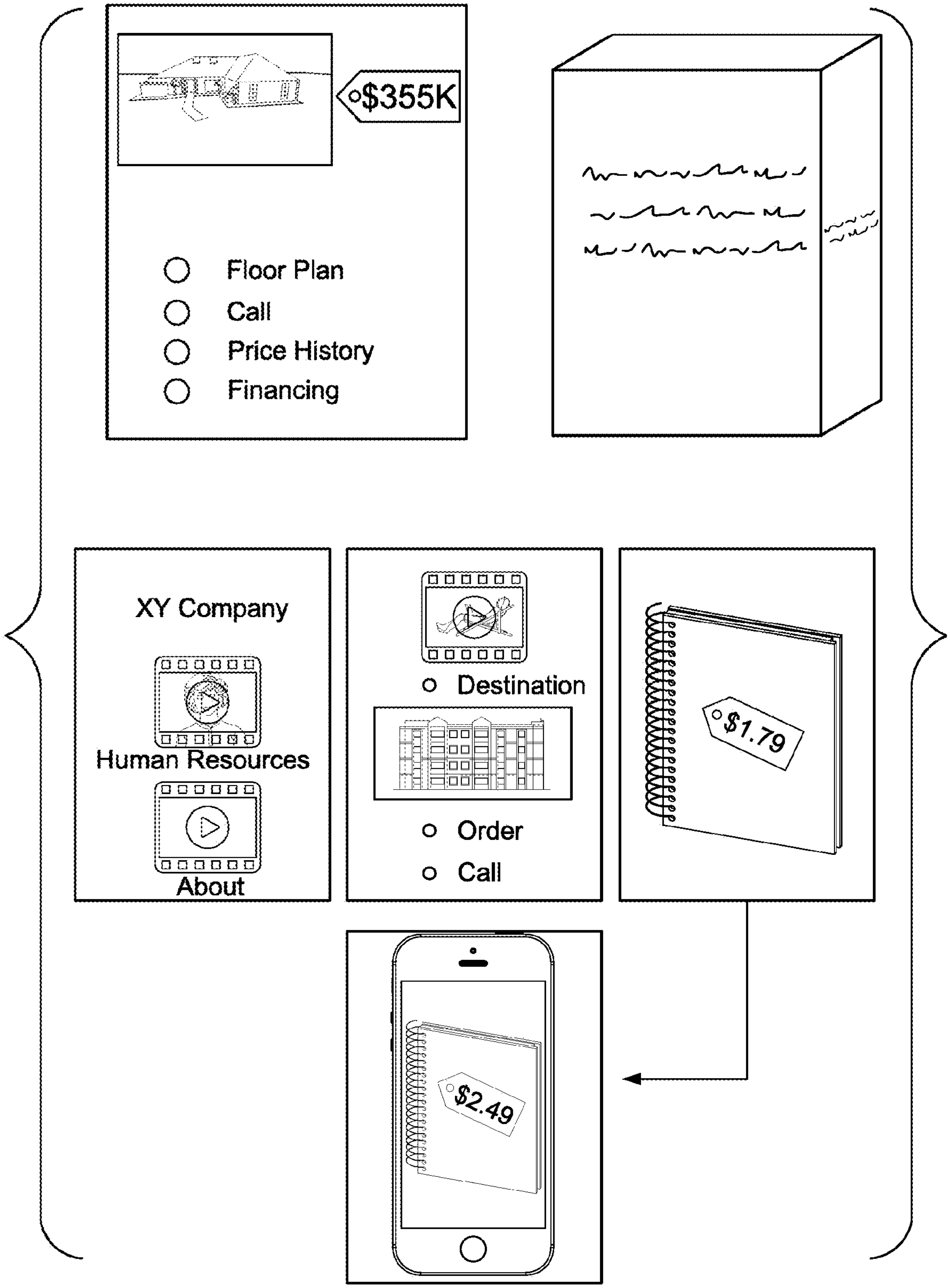
FIG. 17 shows example use cases.

FIG. 17 shows that this technology can be used for a variety of different applications including shopping, real estate, AR on a package, Human Resources (job opportunities), and manuals. For example:

Real Estate Ads in Newspapers, Magazines or on Flyers

AR on product packaging (video of product features, ingredients, discount codes, advertisement, manual, etc.) and store finder where product is available for shopping/reorder.

Human resources advertisement

Travel applications

How to manuals.

The digital overlays can be updated quickly. There is no need to change the print—in case of a price change or other information update, you can just change the information within the digital overlay.

All printed publications cited above (including the ones shown in FIGS. 2A-2J) are hereby incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of presenting flyer information to a user, comprising:

enabling optical capture by a portable camera of an image of a two-dimensional flyer object having printed indicia disposed thereon, the printed indicia including at least one printed character and a security feature;

displaying the captured image;

recognizing the printed indicia from the captured image by pattern matching color and grey-scale information in a predefined recognition area including recognizing the at least one printed character and excluding decoding the security feature;

associating the recognized two-dimensional flyer object with a data record in a database;

selecting a media item in response to the associating; and using augmented reality to superimpose the selected media item onto the display of the captured image of the two-dimensional flyer object or an image derived therefrom such that the selected media item appears to be anchored to or part of the two-dimensional flyer object from different portable camera viewpoints.

2. The method of claim 1 wherein the flyer object comprises a printed advertisement.

3. The method of claim 1 wherein the displaying is performed on a handheld display device.

4. A system for presenting flyer information to a user, comprising:

an electronic display;

a portable camera configurable to capture an image of a two-dimensional flyer object having printed indicia disposed thereon, the printed indicia including at least one printed character and a security feature; and at least one processor configured to perform operations comprising:

displaying the captured image on the electronic display;

recognizing the printed indicia from the captured image by pattern matching color and grey-scale information in a predefined recognition area including recognizing the at least one printed character, without recognizing the security feature; matching the recognized printed indicia with a data record in a database;

selecting a media item in response to the matching; and superimposing, on the electronic display, a selected media item onto the display of the captured image of the two-dimensional flyer object or an image derived therefrom such that the selected media item appears to be anchored to the two-dimensional flyer object from different portable camera viewpoints.

5. The method of claim 4 wherein the recognizing comprises recognizing a two-dimensional flyer object.

6. The method of claim 4 wherein the flyer object comprises a printed advertisement.

7. The method of claim 4 wherein the superimposing is performed on a handheld electronic display device.

* * * * *